(12) United States Patent  (10) Patent No.: US 7,093,049 B2
Harada et al.  (45) Date of Patent: Aug. 15, 2006

(54) RECORDING MEDIUM HOLDER HAVING ONE OR MORE RECORDING MEDIUMS

(75) Inventors: Shunji Harada, Osaka (JP); Noriko Sugimoto, Amagasaki (JP); Shoichiro Nakata, Nishinomiya (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 341 days.

(21) Appl. No.: 10/602,590

(22) Filed: Jun. 25, 2003

(65) Prior Publication Data

US 2004/0054863 A1 Mar. 18, 2004

(30) Foreign Application Priority Data

Jun. 27, 2002 (JP) .............................. 2002-188106

(51) Int. Cl.
*G06F 12/14* (2006.01)

(52) U.S. Cl. ...................... 710/303; 713/202; 713/201; 713/168; 711/115; 711/164; 711/2; 711/170; 710/301; 710/13; 710/2; 710/300

(58) Field of Classification Search ................. None
See application file for complete search history.

(56) References Cited

U.S. PATENT DOCUMENTS 5,857,024 A * 1/1999 Nishino et al. ............. 713/172
2002/0078297 A1 6/2002 Katsumi et al.

FOREIGN PATENT DOCUMENTS

| GB | 2 369 223 | 5/2002 |
|---|---|---|
| JP | 1-142892 | 6/1989 |
| JP | 2-115996 | 4/1990 |
| JP | 4-361394 | 12/1992 |
| JP | 04-367074 | 12/1992 |
| JP | 4-367090 | 12/1992 |
| JP | 6-333097 | 12/1994 |
| JP | 10-171949 | 6/1998 |
| JP | 2000-29998 | 1/2000 |
| JP | 2000-32582 | 1/2000 |
| JP | 2001-101356 | 4/2001 |
| JP | 2001-169225 | 6/2001 |
| JP | 2001-195550 | 7/2001 |

* cited by examiner

*Primary Examiner*—B. James Peikari
(74) *Attorney, Agent, or Firm*—Wenderoth, Lind & Ponack, L.L.P.

(57) ABSTRACT

A recording medium holder enables a user to easily find a desired recording medium from recording mediums that the user manages. The recording medium holder includes a recording medium holding unit for holding a plurality of recording mediums, a liquid crystal displaying unit for displaying each of the plurality of recording mediums held in the recording medium holding unit by an icon, and an information displaying unit for displaying information of a recording medium that corresponds to an icon clicked in the liquid crystal displaying unit, the information including ID information, title information, index information, and other information. The information is read out from the recording medium at a first click, and from a storing unit at a second click and after.

4 Claims, 29 Drawing Sheets

FIG.5
| DISPLAYED SLOT ICONS | INDICATION |
|---|---|
| 1101 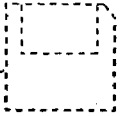 | NO MEMORY CARD INSERTED |
| 1102 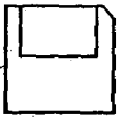 | A MEMORY CARD INSERTED |
| 1103  | MEMORY CARD AUTHENTICATION FAILURE |
|  1101 ↔ 1102 | BLINKING SLOT ICON |
| 1104 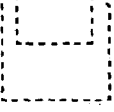<br>1105 <br>1106 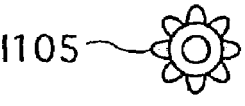 | SPECIFIED SLOT ICONS |

INFORMATION STORING UNIT — 221

GENERAL AREA

ENCRYPTED CONTENT

CONTENT

| ID | CONTENT TITLE | INFORMATION TYPE | GENERATED DATE | RENEWAL DATE |
|---|---|---|---|---|
| ID | CONTENT TITLE | INFORMATION TYPE | GENERATED DATE | RENEWAL DATE |

SECURE AREA — 222

DECRYPTING KEY

DECRYPTING KEY

SYSTEM AREA — 223

MEDIUM PASSWORD

MEDIUM ID

MEDIUM TYPE INFORMATION

MANUFACTURER

MEDIUM NAME

OWNER NAME

GENERATED DATE

RENEWAL DATE

MEDIUM ICON INFORMATION

MEDIUM TITLE

FIG.19

ID CORRESPONDENCE TABLE

521

| COMMUNICATING UNIT ID | MEDIUM ID | MARK |
|---|---|---|
| 1 | SD001 | ☆ |
| 2 | SD001 | |
| 3 | SD002 | |
| 4 | SD002 | ☆ |
| 5 | SD003 | |
| 6 | SD003 | |
| ⋮ | ⋮ | |
| 100 | — | |

RECORDING MEDIUM HOLDER HAVING ONE OR MORE RECORDING MEDIUMS

This application is based on an application No. 2002-188106 filed in Japan, the content of which is hereby incorporated by reference.

BACKGROUND OF THE INVENTION (1) Field of the Invention

The present invention relates to a holding apparatus that holds recording mediums for storing information.

(2) Description of the Prior Art

Recording mediums such as flexible disks (FDs) have been utilized to store digital information.

In order that users can easily see what digital information is stored in a FD, a label, which shows such information as titles and index indicating content of digital information stored in the FD, is attached to an outer surface of the FD. Thus, users can find a desired FD by the label attached thereto.

With the reduced size of recording mediums, however, the size of labels to be attached thereto has become increasingly small. As a result, such problems have been noted that the label is not large enough to show sufficient information, and that the recording medium is too small to have a label attached thereto.

As one solution to the above problems, Japanese Laid-Open Patent Application No. H02-115996 discloses a technique for identifying a PC card by information about content indicated in a display mounted on a surface of the card.

(Prior Art 1)

Japanese Laid-Open Patent Application No. H02-115996

In addition, Japanese Laid-Open Patent Application No. H04-367090 discloses a technique for displaying data such as titles in a liquid crystal display (LCD) unit mounted on a memory card. Both of the above techniques use displays mounted on cards in place of labels, and have information about the content shown therein.

(Prior Art 2)

Japanese Laid-Open Patent Application No. H04-367090

Further, Japanese Laid-Open Patent Application No. 2001-101356 discloses a technique for displaying additional information such as stored images and dates, which are stored in a PC card, in an LCD mounted on a PC card adapter.

(Prior Art 3)

Japanese Laid-Open Patent Application No. 2001-101356

Moreover, Japanese Laid-Open Patent Application No. 2000-29998 discloses a recording and reproducing device to which a plurality of memory cards can be attached. The recording and reproducing device includes a displaying unit for showing contents of an active memory card. In addition, Japanese Laid-Open Patent Application No. 2000-32582 discloses a headphone system where a plurality of memory cards are contained in a headband part having a changer mechanism for selecting one of the plurality of memory cards and reproducing contents. In three of the above techniques, a holder that holds recording mediums display contents of the recording mediums.

(Prior Art 4)

Japanese Laid-Open Patent Application No. 2000-29998

(Prior Art 5)

Japanese Laid-Open Patent Application No. 2000-32582

While the problem regarding attaching labels on the recording mediums can be solved according to the above listed conventional arts, however, a problem is still noted that it becomes increasingly difficult for the users to find the desired recording medium as the number of recording mediums that each user owns increases.

SUMMARY OF THE INVENTION

An object of the present invention is to solve the above noted problem and to provide a recording medium holder and an electronic card system that enable an easy search for a recording medium desired by a user regardless of the number of recording mediums that the user owns.

The present invention relates to a recording medium holder that enables an efficient and safe management of a plurality of recording mediums, and aims to display information safely even when the information stored in the recording mediums is secret. The recording medium holder includes a unit operable to display contents of the recording mediums so that the user can immediately find a desired recording medium when the user owns more than one recording medium. The recording medium holder also includes a unit operable to display the contents of the recording mediums only when the displaying of the contents of the recording mediums is allowed if the contents of the recording mediums are secret.

The recording medium holder includes a recording medium holding unit for holding a plurality of recording mediums, a liquid crystal displaying unit for displaying each of the plurality of recording mediums held in the recording medium holding unit by an icon, and an information displaying unit for displaying information of a recording medium that corresponds to an icon clicked in the liquid crystal displaying unit, the information including ID information, title information, index information, and such. The information is read out from the recording medium at a first click, and from a storing unit at a second click and after.

The present invention also relates to an electronic card system including more than one card and an extracting apparatus that enables the user to check contents of cards without inserting a card into an apparatus and to extract a specific card out of the more than one card. According to conventional arts, it is difficult to find a desired card from the more than one card when the number of cards to be managed increases. For example, it takes time and effort to find a card having smallest disk space because the user cannot determine the disk space without inserting the card into an apparatus such as a personal computer. As explained above, it is difficult to find a card in which specific data is stored or a card that has more disk space according to the conventional arts. The present invention solves the above problem.

The present invention also relates to an electronic card system including an electronic card having a re-writable memory function that is capable of being supplied with power without being connected to other apparatuses, and an extracting apparatus having power supply within and being capable of supplying power to the electronic cards. The electronic cards are capable of giving the user warnings by messages outputted from the extracting apparatus.

Specifically, the electronic cards received data transmitted from the extracting apparatus. Next, the electronic cards send data that the electronic card contains, such as a name of the electronic card, a disk space, and an owner's name, to the extracting apparatus. Based on rules the user set for extracting, the extracting apparatus specifies one of the electronic cards. Next, the extracting apparatus transmits a card ID and an extracting message to the specified electronic card. Next, the specified electronic card that received the extracting message notifies the user of being extracted by such a function as emitting light, vibrating, and sound output that is provided to the electronic card.

The present invention further relates to an electronic card system including an electronic card having a re-writable memory function that is capable of being supplied with power without being connected to other apparatuses, and an extracting apparatus having power supply within and being capable of supplying power to the electronic cards. Information about the electronic cards such as the card ID, the title information, and the disk space are displayed in the information displaying unit.

Note that the electronic card receives data sent from the extracting apparatus and then sends the information of the electronic card to the extracting apparatus, and the extracting apparatus displays the information on the electronic card in the information displaying unit.

BRIEF DESCRIPTION OF THE DRAWINGS

These and the other objects, advantages and features of the invention will become apparent from the following description thereof taken in conjunction with the accompanying drawings which illustrate a specific embodiment of the invention.

In the drawings:

FIG. 5 illustrates shapes of slot icons along with indications;

FIG. 8 illustrates an example of information stored in a information storing unit 203;

FIG. 10 is a flow chart showing an operation of the memory card holder 10 right after power is turned on;

FIG. 19 shows a data structure of an ID correspondence table that an information storing unit 514;

DESCRIPTION OF THE PREFERRED EMBODIMENTS

1. First Embodiment

An explanation about a memory card holder 10 as a first embodiment according to the present invention is given below.

1.1 Memory Card Holder 10

Figure 1:
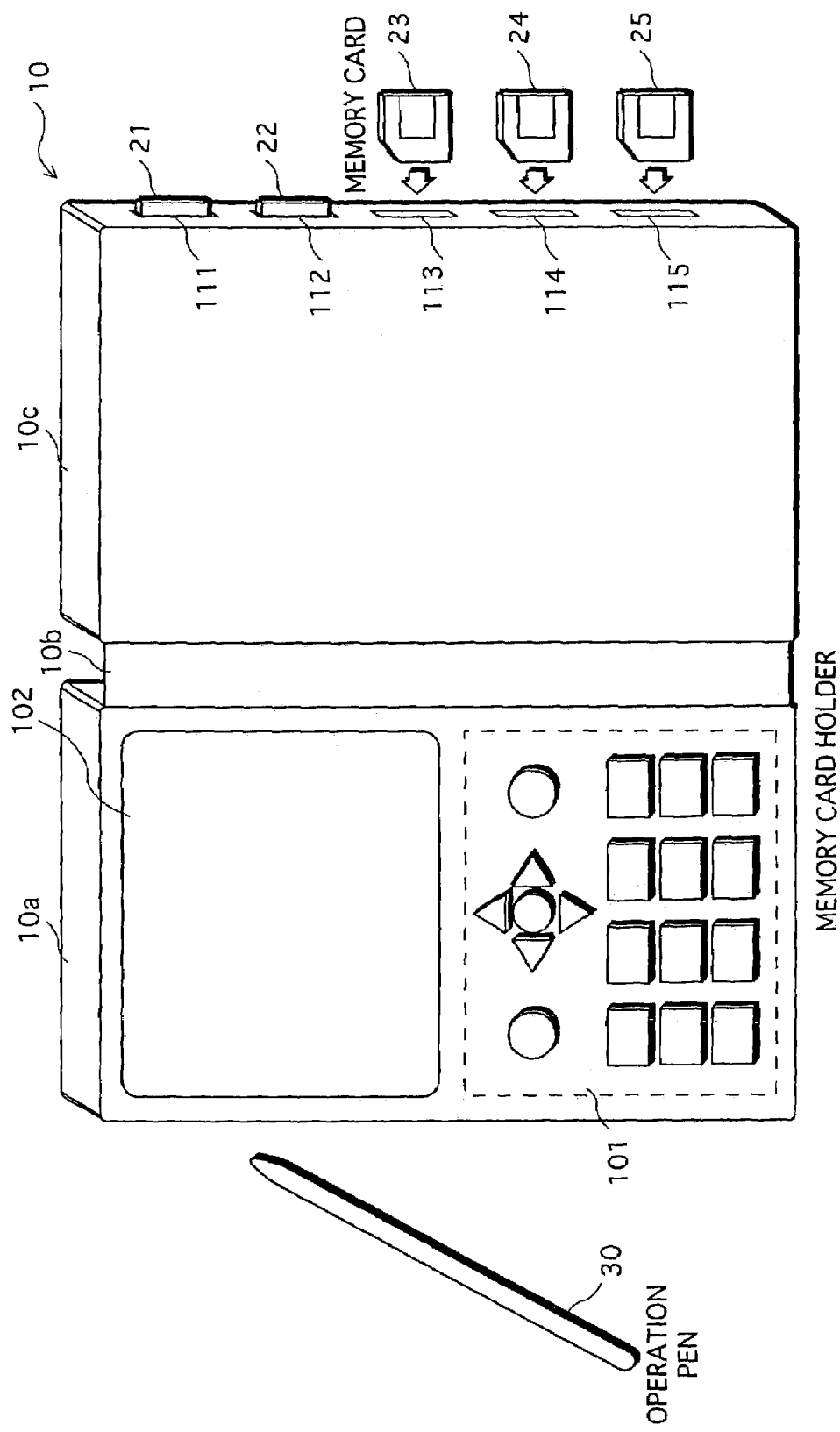
FIG. 1 illustrates an outside view of a memory card holder 10.

The memory card holder 10 is a holding device having a notebook shape as shown in an outside view of FIG. 1, and is capable of holding up to 5 memory cards. The memory card holder 10 includes an input displaying unit 10a, a connecting member 10b, and a card holding unit 10c. The input displaying unit 10a and the card holding unit 10c are connected by the connecting member 10b. The connecting member 10b is made of flexible material, and when the connecting member 10b is flexed, the memory card holder 10 is folded such that the card holding unit 10c covers a surface of the input displaying unit 10a.

A user usually uses the memory card holder 10 while the input displaying unit 10a and the card holding unit 10c are spread out as shown in FIG. 1.

The card holding unit 10c includes 5 card connecting units 111–115, each of the card connecting units being capable of holding one memory card inserted therein, and the inserted memory cards and the memory card holder 10 are in an electrical connection. In the drawing, memory cards 21 and 22 are inserted into the card connecting units 111 and 112 respectively, and the card connecting units 113–115 are empty.

The input displaying unit 10a includes an input unit 101 and a displaying unit 102. The input unit 101 includes a number pad, a power on/off key, a selection decision key, arrow keys, and other keys, on an upper surface thereof. The displaying unit 102 is a touch panel type and displays information in a liquid crystal display and accepts instructions by the user via an operation pen 30.

Figure 2:
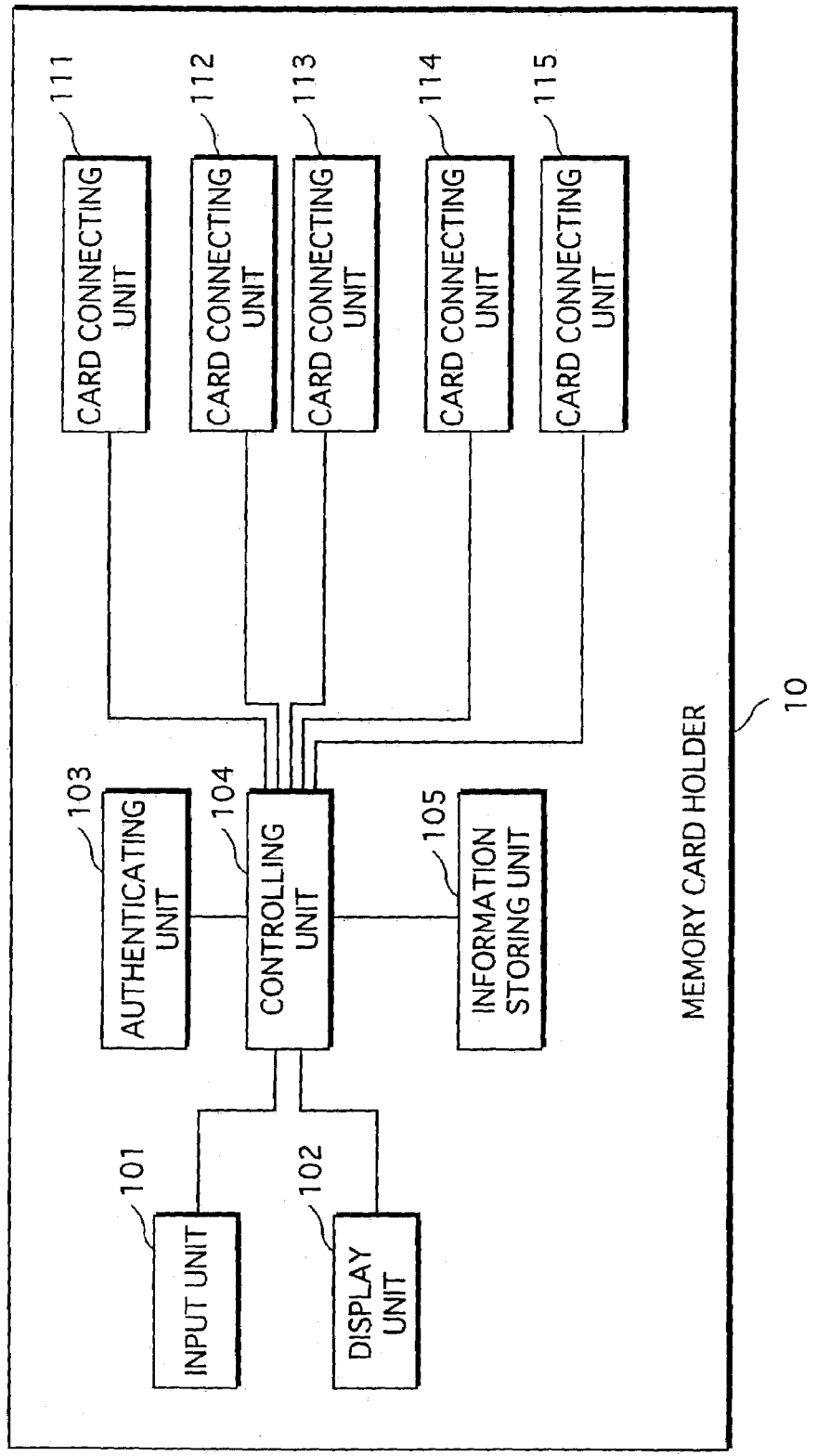
FIG. 2 is a block diagram illustrating a construction of the memory card holder 10.

As shown in the block diagram in FIG. 2, the memory card holder 10 includes the input unit 101, the displaying unit 102, an authenticating unit 103, a controlling unit 104, an information storing unit 105, and the card connecting units 111–115.

Specifically, the memory card holder 10 is a computer system including a microprocessor, a ROM, a RAM, a liquid crystal displaying unit, and such. The RAM stores a computer program. The memory card holder 10 achieves a desired function by the microprocessor operating following the computer program.

(1) Information Storing Unit 105

Figure 3:
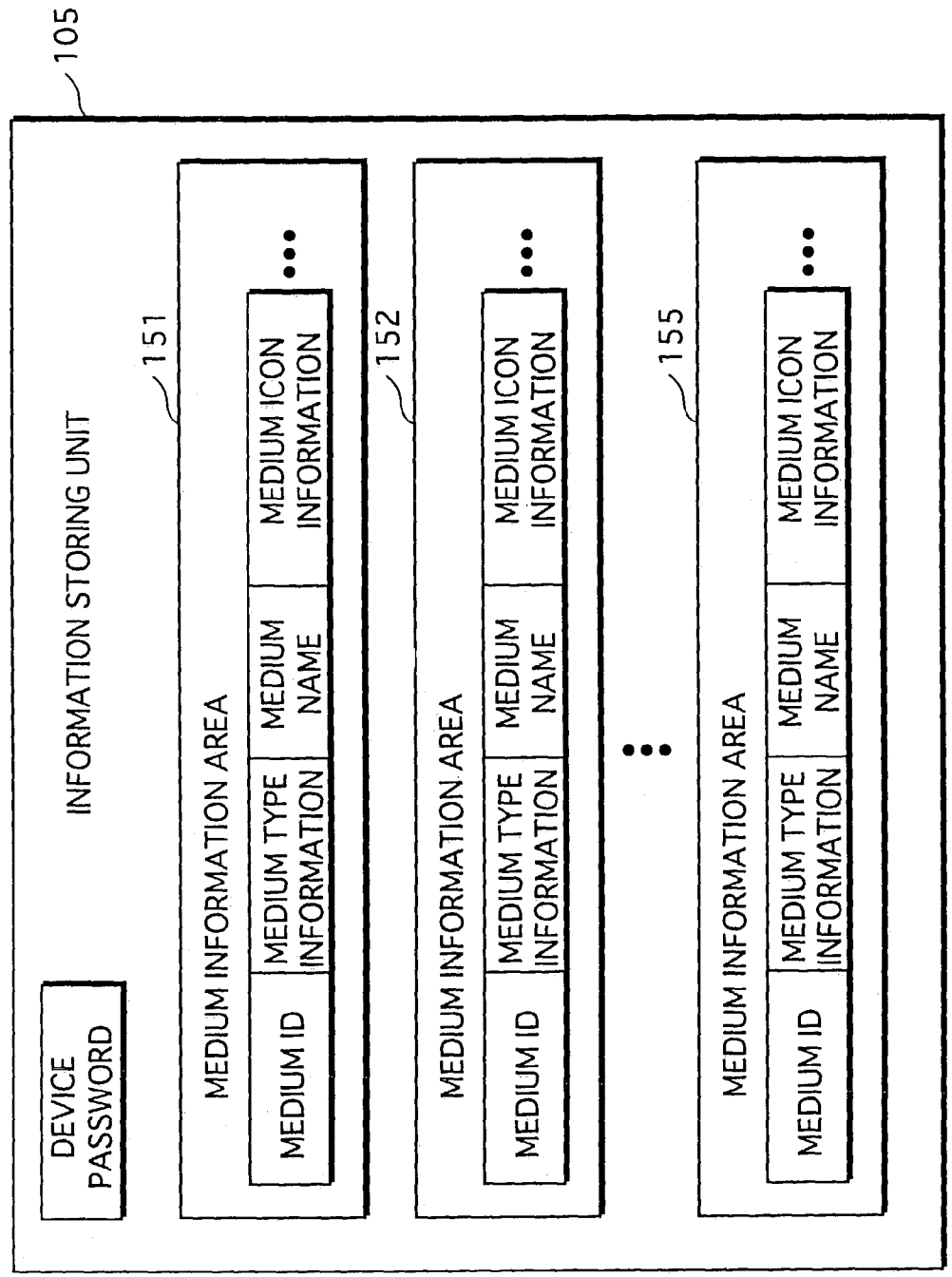
FIG. 3 illustrates an example of information stored in a information storing unit 105.

As shown in FIG. 3 as an example, the information storing unit 105 includes an area for storing a device password and medium information areas 151–155.

The device password is uniquely assigned to the memory card holder 10, and written in the area in advance.

The device password is for allowing only a user who knows the device password (usually, the owner of the memory card holder) to access the memory card holder. Anyone who does not know the device password is not allowed to use the memory card holder legally.

The medium information areas 151–155, each corresponding to the card connecting units 111–115 respectively, are for storing various information stored in the memory cards inserted in the card connecting units 111–115.

As shown in the drawing, the medium information area 151 includes an area for storing a medium ID, a medium type information, a medium name, a medium icon information, and other information that are not shown in this drawing.

The medium information areas 152–155 have the same structure as the medium information area 151.

(2) Displaying Unit 102

The displaying unit 102 includes a dual structured panel made of (i) a liquid crystal panel for indicating information by liquid crystals and (ii) a touch panel mounted on the liquid crystal panel for detecting a touch position. The displaying unit 102 displays, for example, a screen 161 and a screen 171 shown in FIG. 4 and FIG. 6, both of which are displayed under control of the controlling unit 104.

The displaying unit 102, when a part of the screen is pressed with the operation pen 30 by the user, also outputs an instruction information corresponding to an image or a text string at a pressed position on the screen to the controlling unit 104.

(Screen 161)

The screen 161 includes slot icons 161a, 161b, . . . , and 161e, a medium information displaying screen 161f, a search button 161g, and a quit button 161h.

The slot icons 161a, 161b, . . . , and 161e each correspond to the card connecting units 111–115 and indicate whether a memory card is inserted and electrically connected to the card connecting units 111–115.

FIG. 5 illustrates examples of the slot icons displayed on the screen 161, along with indications of the icons.

A slot icon I101 shown in this drawing indicates that no memory card is inserted in the corresponding card connecting unit. A slot icon I102 indicates that a memory card is inserted in and electrically connected to the corresponding card connecting unit.

Further, a slot icon I103 indicates that a mutual authentication between the memory card holder 10 and the memory card that is inserted in the corresponding card connecting unit has failed.

The slot icons I101 and I102 in the fourth row indicate that the slot icons are displayed alternately at short time intervals. The meaning of the blinking is to be explained later.

In addition, slot icons I104–I106 each indicate medium icons stored in the memory cards that are inserted in and connected to the corresponding card connecting unit. The slot icons I104–I106 are shown only when special memory cards that store the slot icons for themselves are inserted. Note that the slot icon I102 is a default icon shown when the memory card inserted in the corresponding card connecting unit does not store a medium icon for itself In the first embodiment, the memory card stores an icon in advance. The present invention is not restricted to this embodiment, however, and it is also possible that the memory card holder stores several icons for typical memory cards, and displays one of the special icons when a corresponding card is inserted.

Figure 4:
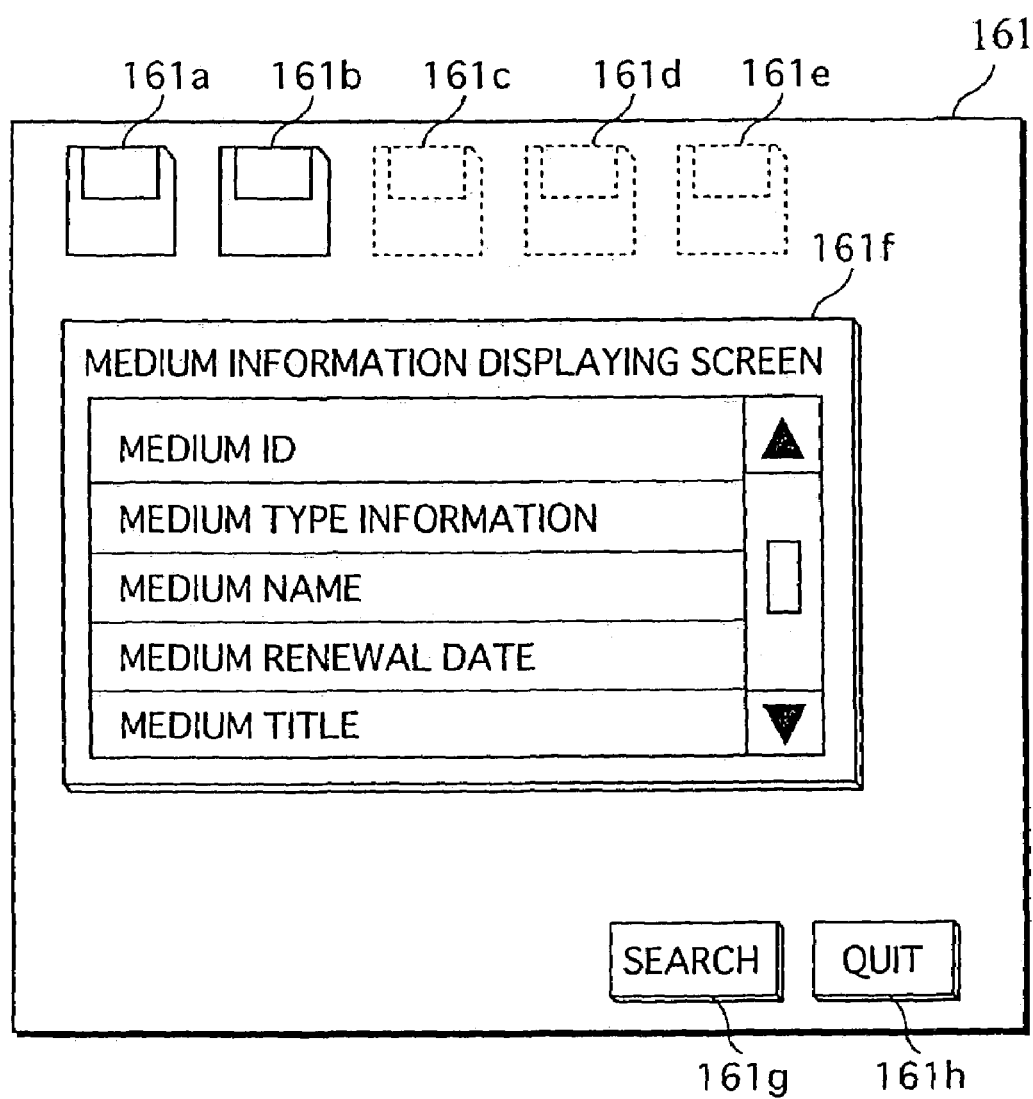
FIG. 4 illustrates a construction of a screen 161 shown in a displaying unit 102.

The medium information displaying screen 161f displays various information stored in a memory card selected by the user among connected memory cards. As shown in FIG. 4, the medium information displaying screen 161f includes 5 display items and a scroll bar. In FIG. 4, information shown as the 5 display items is the medium ID, the medium type information, the medium name, the medium renewal date, and the medium title. The memory card stores other information therein, and the other information is displayed in the medium information displaying screen 161f by operation of a scroll bar using the operation pen 30. The scroll bar is a well-known technique, which is commonly used in displays of personal computers, and explanation is not given here.

The search button 161g is operated by the user in order to start the searching process that is explained later.

The quit button 161h is operated by the user in order to terminate the process in the memory card holder 10 and turn the power off.

(Screen 171)

Figure 6:
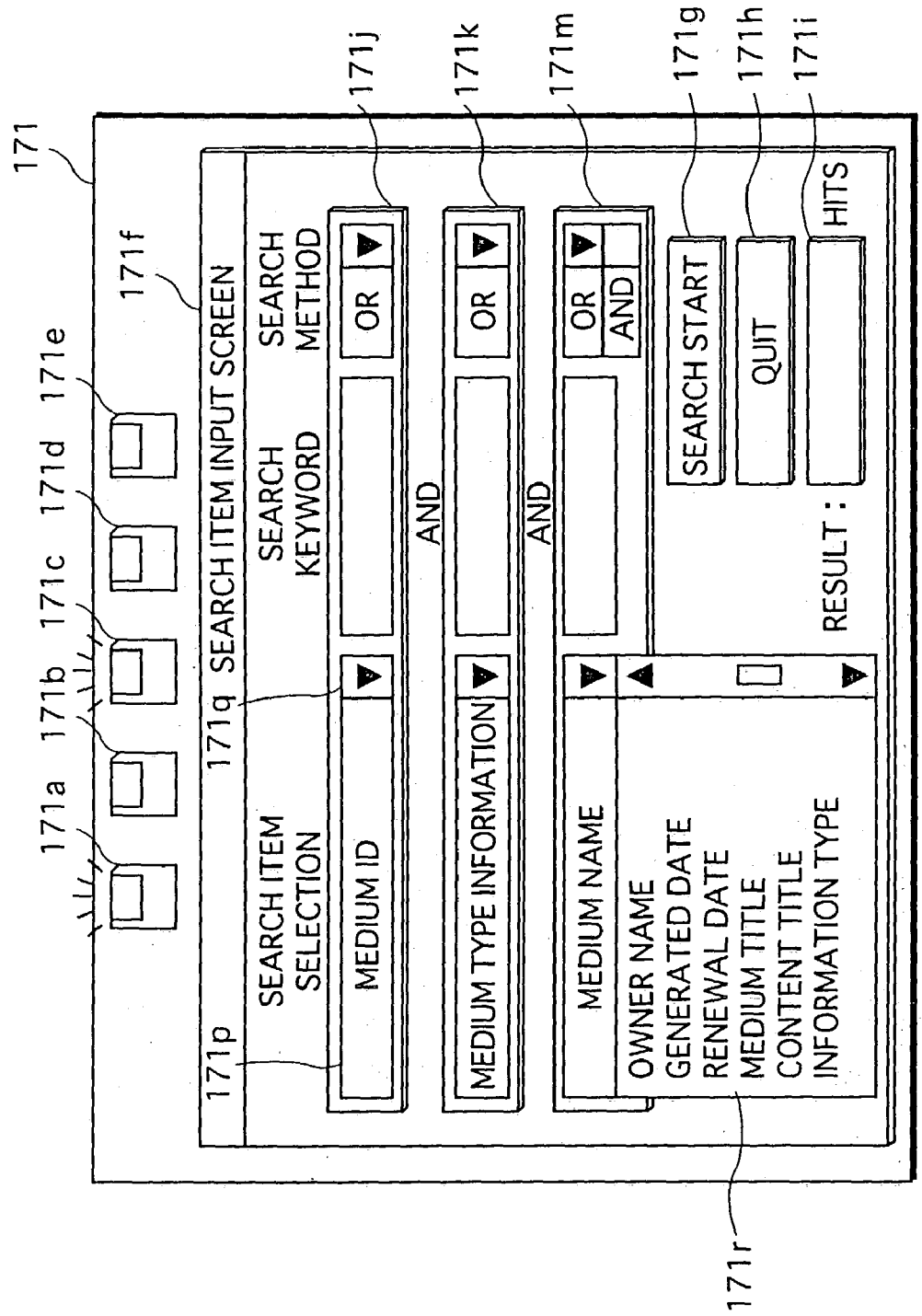
FIG. 6 illustrates a construction of a screen 171 shown in a displaying unit 102.

As shown in FIG. 6 as an example, the screen 171 includes slot icons 171a, 171b, and 171e, and a search item input screen 171f.

The slot icons 171a, 171b, . . . , and 171e each are the same as the slot icons 161a, 161b, . . . , and 161e in FIG. 4. Note that FIG. 6 indicates the slot icons 171a and 171c are blinking. The blinking icons indicate that it is judged that the memory cards corresponding to the icons satisfy a condition in a searching process that will be detailed later.

As shown in FIG. 6, the search item input screen 171f includes search condition input fields 171j, 171k and 171m, a search start button 171g, a quit button 171h, and a result displaying area 171i. The search condition input field 171j includes a search item selecting field, a search keyword input field, and a search method selecting field.

The search item selecting field includes a search item input area 171p and a menu displaying button 171q. The search item input area 171p is used to specify information stored in the memory cards, and the user selects one of the medium ID, the medium type information, the medium name, and the other information. The menu displaying button 171q is used to display a menu 171r including the medium ID, the medium type information, the medium name and the other information. When the menu 171r is displayed, the user selects one of options that the menu 171r includes.

The search keyword input field is an area for accepting one or more text strings to be searched by the user.

The search method selecting field accepts one of an "AND condition" and an "OR condition" by the user. The "AND condition" and the "OR condition" each indicate conditions when two or more words are entered in the search keyword input field.

Specifically, when the "medium ID" is selected in the search item selection area, "SD0001 SD0002" is inputted in the search keyword input field, and "OR" is selected in the search method selecting field, it is considered that a search condition "search ID='SD0001' OR search ID='SD0002'" is specified.

The search condition input fields 171k and 171m are the same as the search condition input field 171j, and each include a search item selecting field, a search keyword input field, and a search method selecting field.

For example, when the search condition is selected and entered in each of the search condition input fields 171j and 171k, the specified search condition is "'the search condition entered in the search condition input field 171j' AND 'the search condition entered in the search condition input field 171k'".

The above also applies to a case in which the search condition is selected and entered in each of the search condition input fields 171j–171m.

The search start button 171g is for starting the searching process based on the search condition selected and entered as above, and operated by the user.

The quit button 171h is operated by the user in order to terminate the searching process.

The result displaying area 171i displays a number of memory cards that satisfy the search condition as a result of the searching process.

(3) Card Connecting Unit 111–115

The card connecting unit 111 holds a memory card. The memory card held therein is electrically connected to the Memory card holder 10. The user inserts the memory card in the card connecting unit 111, and connects the memory card to the card connecting unit 111. When the memory card is connected, under control of the controlling unit 104, the card connecting unit 111 reads various information from the memory card and outputs the information to the controlling unit 104.

The card connecting units 112–115 are the same as the card connecting unit 111, and an explanation is not given here.

(4) Input Unit 101

The input unit 101 includes the number pad, the power on/off key, the selection decision key, the arrow keys, and other keys, which are operated by the user and output instruction information corresponding to each key to the controlling unit 104.

(5) Authentication Unit 103

The authenticating unit 103 performs a challenge and response type mutual authentication with the memory card connected to the card connecting unit 111 under control of the controlling unit 104. The challenge and response type authentication between apparatuses is a well-known technique and an explanation is not given here.

The authenticating unit 103 also performs the challenge and response type mutual authentication, as described above, between each of the memory cards connected to the card connecting units 112–115 under control of the controlling unit 104.

(6) Controlling Unit 104

The controlling unit 104 controls the input unit 101, the displaying unit 102, the authenticating unit 103, the information storing unit 105, and the card connecting units 111–115. Details about how the controlling unit 104 controls the above units will be explained later.

1.2 Memory Card 21

Figure 7:
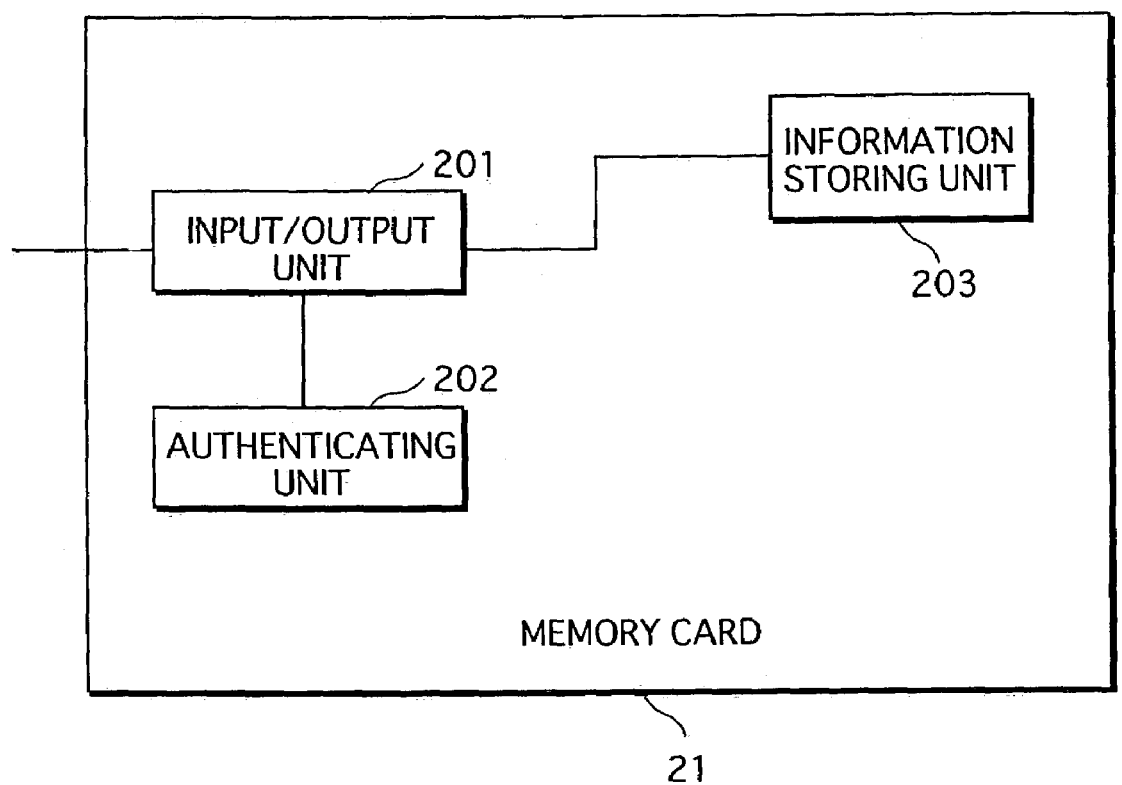
FIG. 7 is a block diagram illustrating a construction of the memory card 21.

As shown in FIG. 7, a memory card 21 includes an input/output unit 201, an authenticating unit 202, and an information storing unit 203.

(1) Input/Output Unit 201

When the memory card 21 is inserted into one of the card connecting units of the memory card holder 10, the memory card 21 and the input/output unit 201 are electrically connected.

The input/output unit 201 reads information stored in a designated part of the information storing unit 203 and outputs the information to an external device (the memory card holder 10 in this embodiment) to which the memory card 21 is connected, or receives information from the external device under control of the external device and stores the information in the designated part of the information storing unit 203.

(2) Authenticating Unit 202

The authenticating unit 202 performs the challenge and response type mutual authentication with the external device to which the memory card 21 is connected. The challenge and response type authentication between apparatuses is a well-known technique and an explanation is not given here.

(3) Information Storing Unit 203

As shown in FIG. 8, the information storing unit 203 includes a general area 221, a secure area 222, and a system area 223.

(General Area 221)

The general area 221 is an area in which a device having no particular permission can write and read information.

As shown in FIG. 8 as an example, the general area 221 stores one or more encrypted contents, one or more contents, and pieces of index information respectively corresponding to the encrypted contents and the contents. As shown in the same drawing, examples of the index information include a content ID, a content title, a type of information, a generated date, and a renewal date.

A content is made of sound, images, and other digital information. An encrypted content is generated by encrypting such a content using a given encrypting algorithm.

The content ID is an identifier for identifying the content. The content title is information indicating a subject of the content. The information type indicates the type of the content: music, image, text, and the like. The generated date indicates the date on which the content has been generated. The renewal date indicates the date on which the content has been last renewed.

(Secure Area 222)

The secure area 222 is an area in which only the external device is allowed to read and write information, only when the mutual authentication is successful between the memory card 21 and the external device which accesses the memory card 21.

As shown in FIG. 8 as an example, the secure area 222 stores one or more decrypting keys. The decrypting keys are used when decrypting the encrypted content stored in the general area 221.

(System Area 223)

The system area 223 is an area which only the external device that is specially allowed can access.

As shown in FIG. 8 as an example, the system area 223 stores a medium password, a medium ID, a medium type information, a manufacturer name, a medium name, an owner name, a medium creation date, a medium renewal date, a medium icon information, and a medium title.

The medium password is for restricting the access to the memory card 21. The medium password is used to grant an access to the memory card 21 only to the user who knows the medium password.

The medium ID is an identification number unique to the memory card 21. The medium type information is information for identifying the type of the memory card 21. For example, the medium type information indicates whether the memory card 21 requires the mutual authentication with the external device to which the memory card 21 is connected. The medium type information also indicates whether the memory card 21 requires the user to enter a password when the memory card 21 is connected to the external device. At this time, the type information further indicates if a password verification uses the medium password stored in the memory card 21 or the device password stored in the external device.

The manufacturer name indicates the manufacturer of the memory card 21, the medium name indicates the memory card 21, and the owner name indicates who owns the memory card 21. The medium creation date indicates the date on which information has been written in the memory card 21 for the first time, and the medium renewal date indicates the date on which information has been last written in the memory card 21. The medium icon information indicates the unique icon to the medium type of the memory card 21, and the medium title indicates the subject of the contents of the memory card 21.

Note that while the explanation in the first embodiment is given about a case in which the information storing unit includes the general area, the secure area, and the system area, the present invention is not restricted to the above example, and the information storing unit may include the general area and the secure area. In this case, the information stored in the system area is to be stored in the secure area.

1.3 Memory Card 22–25

The memory card 22 has a similar construction with the memory card 21. The memory card 22 includes an input/output unit same as the input/output unit 201 and an information storing unit same as the information storing unit 203 shown in FIG. 7. The memory card 22 does not include an authenticating unit.

The information storing unit of the memory card 22 includes a general area same as the general area 221 and a system area same as the system area 223, and does not include a secure area like the secure area 222 shown in FIG. 8.

The memory cards 23 and 24 have the same construction as the memory card 21, and the memory card 25 has the same construction as the memory card 22.

1.4 Operation of Memory Card Holder 10

An explanation of an operation of the memory card holder 10 is given below.

(1) Outline of Operation of Memory Card Holder 10

Figure 9:
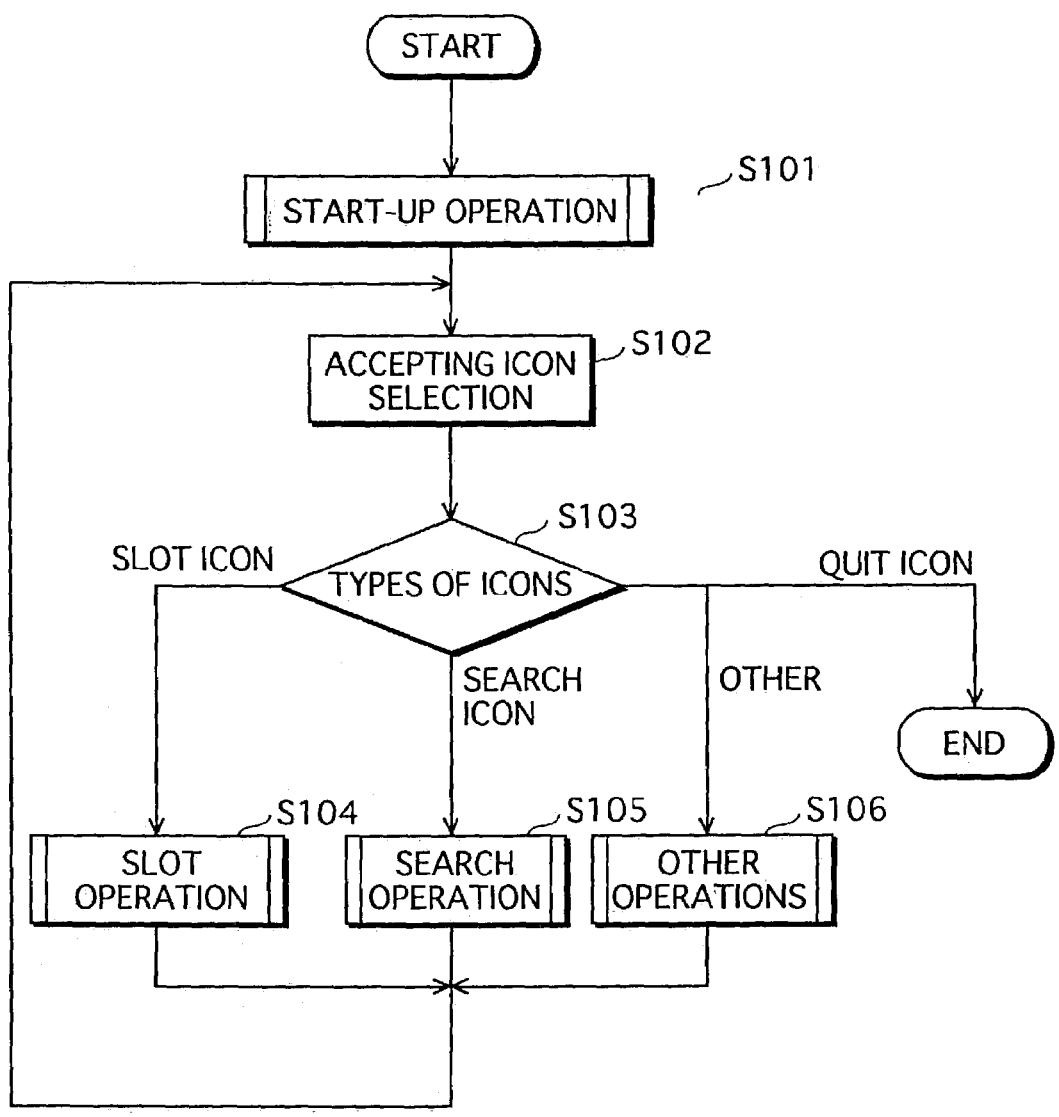
FIG. 9 is a flow chart schematically showing an entire operation of the memory card holder 10.

Here, an outline of the operation of the memory card holder 10 is given in reference to a flowchart shown in FIG. 9.

When the user turns on the power, the memory card holder 10 performs a start-up operation (Step S101).

Next, the displaying unit 102 or the input unit 101 accepts the selection of the icon by the user, and outputs the icon information corresponding to the selected icon to the controlling unit 104 (Step S102).

Then, the controlling unit 104 receives the icon information, and judges if the received icon information indicates a slot icon, a search icon, a quit icon, or other icons. When the icon information indicates the slot icon (Step S103), the controlling unit 104 performs a slot operation (Step S104), and then returns to the Step S102 and repeats the operation.

When the icon information indicates the search icon (Step S103), the controlling unit 104 performs a search operation (Step S105), and then returns to the Step S102 and repeats the operation.

When the icon information indicates other icons (Step S103), the controlling unit 104 performs other operations (Step S106), and then returns to the Step S102 and repeats the operation.

When the icon information indicates the quit icon (Step S103), the memory card holder 10 terminates the operation and turns the power off.

(2) Start-Up Operation

Figure 10:
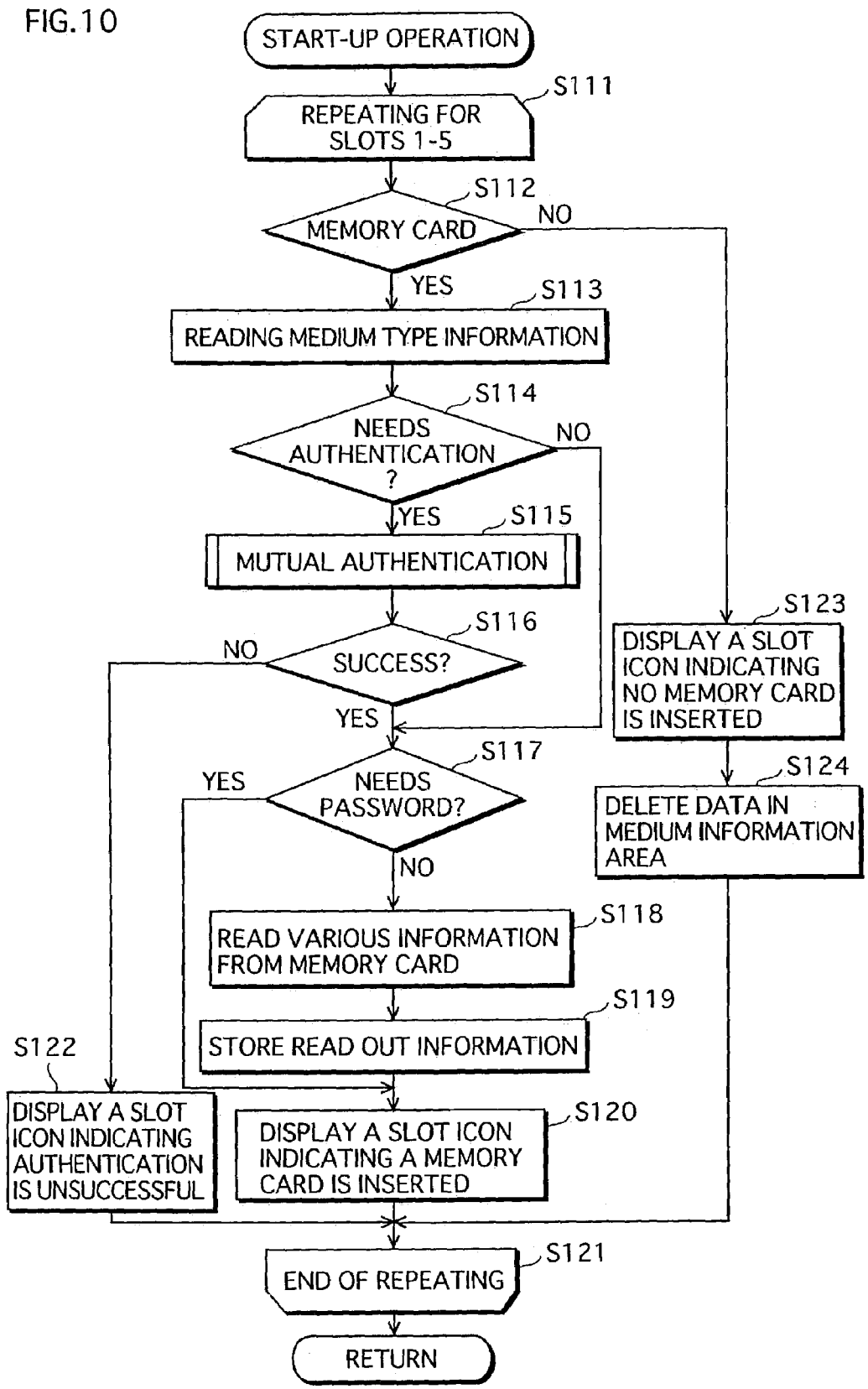

Here, the start-up operation of the memory card holder 10 is explained in accordance with a flow chart shown in FIG. 10. Note that the operation explained below is a detail of Step S101 of the flow chart in FIG. 9.

When the user turns on the power, an operation sequence from Step S111 through Step S121 is performed to each of 5 slots in which the memory cards are inserted, namely the card connecting units 111–115.

Each of the card connecting units judges whether a memory card is inserted therein. When there is no memory card inserted (Step S112), the card connecting unit displays a slot icon, indicating that the memory card is not inserted, at a position corresponding to the card connecting unit (Step S123), clears information written in the medium information area corresponding to the card connecting unit (Step S124), and finishes the operation regarding the corresponding card connecting unit.

When a memory card is connected to the card connecting unit (Step S112), the controlling unit 104 obtains the medium type information from the system area of the memory card connected to the card connecting unit via the input/output units of the card connecting unit and the memory card (Step S113), and then judges whether the memory card requires the mutual authentication.

When the controlling unit 104 judges that the memory card requires the mutual authentication (Step S114), the mutual authentication is performed (Step S115). When an authentication success information that indicates a successful authentication is received from the authenticating unit 103 (Step S116), the controlling unit 104 judges, using the obtained medium type information, whether the memory card requires the password verification.

When the memory card does not require the password verification (Step S117), the controlling unit 104 obtains, via the input/output units of the card connecting unit and the memory card, various information from the memory card that is connected to the card connecting unit (Step S118), and writes the obtained various information in the medium information area corresponding to the card connecting unit (Step S119). Then the controlling unit 104 displays a slot icon, indicating that the memory card is inserted, at a position corresponding to the card connecting unit (Step S120), and finishes the operation regarding the corresponding card connecting unit.

When the controlling unit 104 judges that the memory card does not require an authentication (Step S114), the operation moves to Step S117 without performing the mutual authentication.

When the controlling unit 104 receives an authentication failure information indicating that the authentication is not successful from the authenticating unit 103 (Step S116), the controlling unit 104 displays a slot icon, indicating that the authentication is not successful, at a position corresponding to the card connecting unit (Step S122), and finishes the operation regarding the corresponding card connecting unit.

When the controlling unit judges that the memory card requires an authentication (Step S117), the operation moves to Step S120 without obtaining the various information from the memory card.

As has been explained, the controlling unit judges whether the memory card is inserted in the card connecting unit, and the slot icon indicating insertion of the memory card is displayed when the memory card is inserted and connected, and the slot icon indicating that the memory card is not inserted is displayed when the memory card is not connected.

(3) Slot Operation

Figure 11:
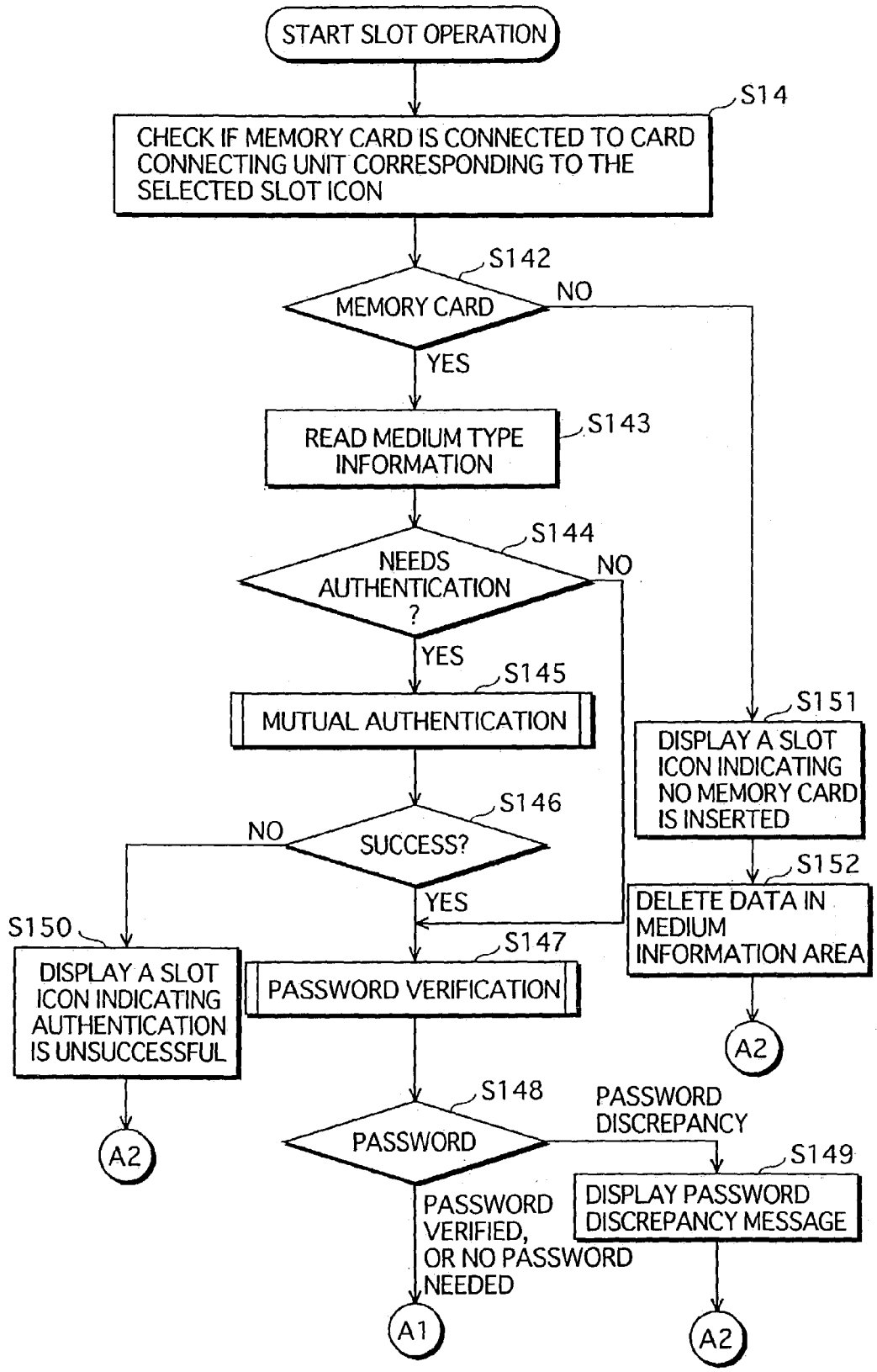
FIG. 11 is a flow chart showing a slot process when a user selects a slot icon; continues to FIG. 12.
Figure 12:
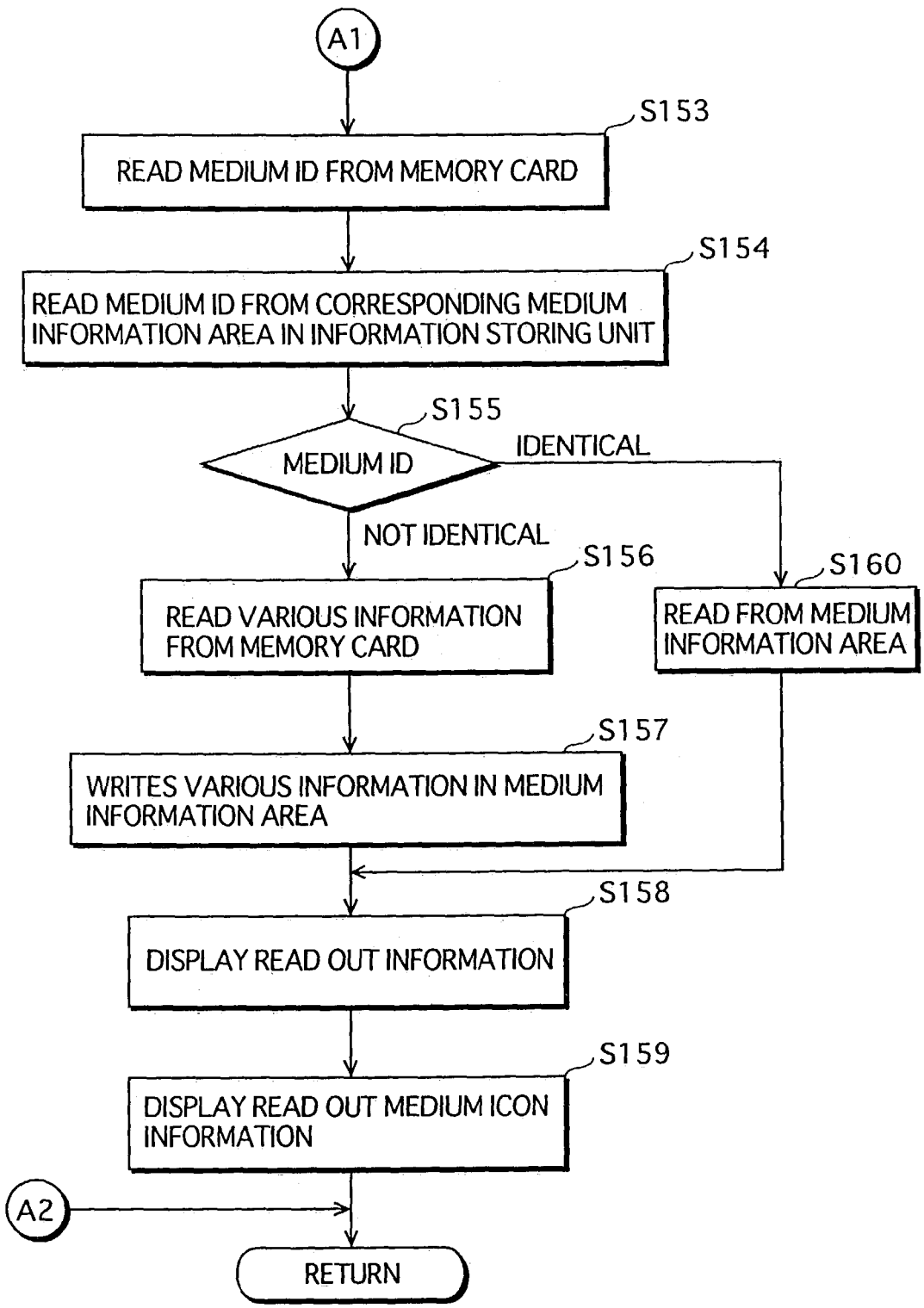
FIG. 12 is a flow chart showing a slot process when a user selects a slot icon; continued from FIG. 11.

Here, the slot operation when the user selects a slot icon is explained in accordance with a flow chart shown in FIGS. 11 and 12. Note that the operation explained below is a detail about Step S104 of the flow chart in FIG. 9.

The controlling unit 104 confirms, via a card connecting unit, whether the memory card is connected to the card connecting unit corresponding to the selected slot icon (Step S141).

When the controlling unit 104 judges that the memory card is connected (Step S142), the controlling unit 104 obtains the medium type information via the input/output units included in the card connecting unit and the memory card (Step S143), and judges based on the obtained medium type information whether the memory card requires the mutual authentication (Step S144).

When the controlling unit 104 judges that the memory card requires the mutual authentication (Step S144), the mutual authentication is performed (Step S145). When an authentication success information that indicates a successful authentication is received from the authenticating unit 103 (Step S146), the password verification is performed (Step S147). When the password has been verified or no password verification is required (Step S148), the controlling unit 104 obtains the medium ID from the memory card (Step S153) and reads the medium ID from the corresponding medium information area in the information storing unit 105 (Step S154) via the input/output units included in the card connecting unit and the memory card, and judges whether the medium IDs from the memory card and the medium information area are identical (Step S155).

When the controlling unit 104 judges that the memory card does not require the authentication (Step S144), the operation moves to Step S147.

When the controlling unit 104 judges that the two medium IDs are identical (Step S155), the controlling unit 104 reads the information stored in the medium information area.

When the controlling unit 104 judges that the two medium IDs are not identical (Step S155), the controlling unit 104 obtains various information from the memory card (Step S156), and writes the various information in the information area (Step S157).

Next, the controlling unit 104 outputs the various information either read out from the medium information area or obtained from the memory card to the displaying unit 102, and the displaying unit 102 displays the various information according to a format illustrated in FIG. 4(Step S158). Then, the medium icon information contained in the various information either read out from the medium information area or obtained from the memory card is outputted to the displaying unit 102, and the displaying unit 102 receives the medium icon information and displays the received medium icon information at the corresponding position in the screen 161 (Step S159), and then finishes the operation.

When the password verification fails (Step S148), the controlling unit 104 outputs a message, to the displaying unit 102, that the password is not correct, and the displaying unit 102 receives the message and displays the received message (Step S149), and then finishes the operation.

When the authentication failure information indicating that the authentication is not successful from the authenticating unit 103 (Step S146), the controlling unit 104 displays an icon indicating an authentication failure at the corresponding, position to the icon for the card connecting unit, and the controlling unit 104 outputs a message indicating the authentication failure to the displaying unit 102 and the displaying unit receives the message and displays the received message (Step S150), and then finishes the operation.

When the controlling unit 104 judges that the memory card is not connected (Step S142), the controlling unit 104 outputs the slot icon indicating that the memory card is not inserted to the displaying unit 102, and the displaying unit 102 receives the slot icon and displays the received slot icon at the corresponding position in the screen 161 (Step S151), and then clears the information stored in the corresponding medium information storing unit (Step S152), and then finishes the operation.

(4) Mutual Authentication

Figure 13:
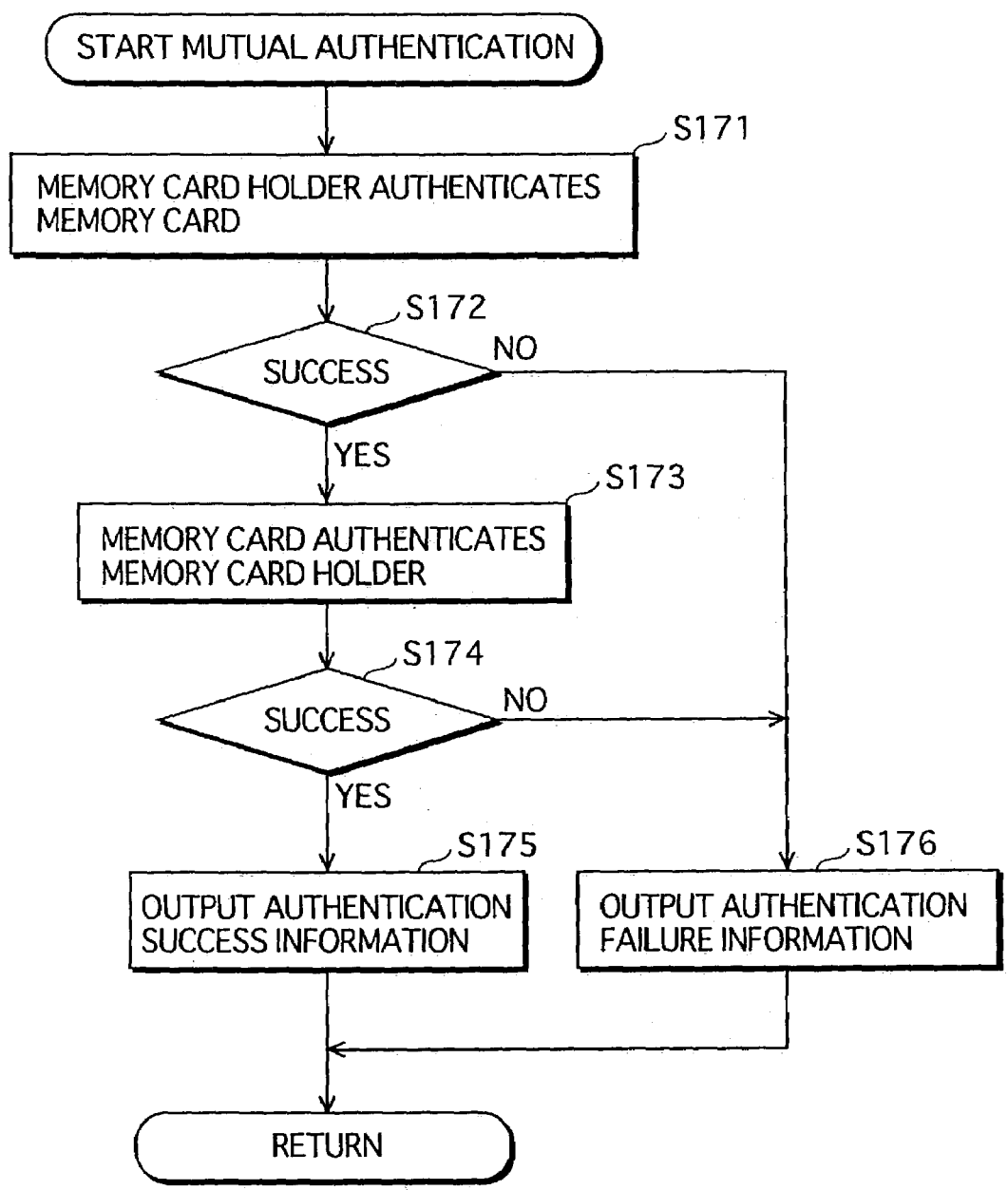
FIG. 13 is a flow chart showing an operation of mutual authentication between the memory card holder 10 and a memory card that requires an authentication.

An explanation of the mutual authentication sequence between the memory card holder 10 and the memory card that requires the authentication is given in accordance with a flow chart shown in FIG. 13. The sequence explained below is a detail of Step S115 in the flow chart in FIG. 10 and Step S145 in the flow chart in FIG. 11.

The authenticating unit 103 of the memory card holder 10 authenticates the memory cards (Step S171). When the authentication is successful (Step S172), the authenticating unit 202 of the memory card authenticates the memory card holder 10 (Step S173). When the authentication is successful (Step S174), the authenticating unit 103 outputs the authentication success information indicating that the authentication is successful to the controlling unit 104 (Step S175).

When the authentication is not successful (either Step S172 or Step S174), the authenticating unit 103 outputs the authentication failure information indicating that the authentication is not successful to the controlling unit 104 (Step S176).

(5) Password Verification Operation

Figure 14:
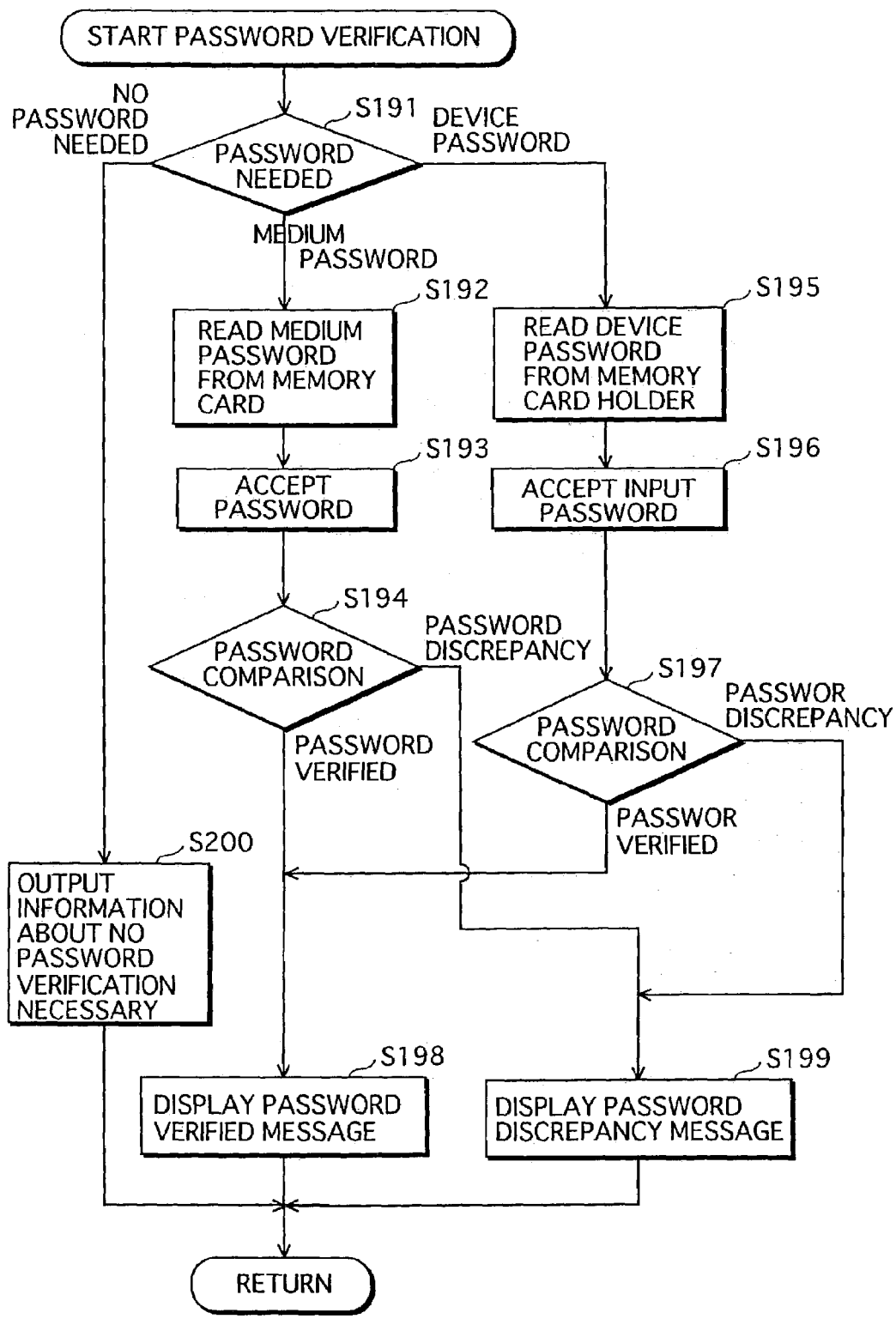
FIG. 14 is a flow chart showing an operation of a password verification.

An explanation of a password verification operation is given in accordance with a flow chart shown in FIG. 14. The sequence explained below is a detail of Step S147 in the flow chart in FIG. 11.

The controlling unit 104 judges if the memory card requires the password verification, based on the obtained medium type information. When the memory card requires the password verification, the controlling unit 104 further judges whether the memory card requires a device password verification or a medium password verification (Step S191).

When the memory card does not require the password verification (Step S191), the controlling unit 104 outputs information that the password verification is not required (Step S200), and finishes the operation.

When the memory card requires the medium password verification (Step S191), the controlling unit 104 obtains the medium password from the memory card via the input/output units included in the card connecting unit and the memory card (Step S192), accepts the user password (Step S193), and judges whether the obtained medium password and the user password are identical (Step S194).

When the controlling unit 104 judges that the two passwords are identical (Step S194), the controlling unit 104 outputs information that the password is verified (Step S198), and finishes the operation.

When the controlling unit 104 judges that the two passwords are not identical (Step S194), the controlling unit 104 outputs information that the password is not verified (Step S199), and finishes the operation.

When the memory card requires the device password verification (Step S191), the controlling unit 104 reads the device password from the information storing unit 105 (Step S195), accepts an input of a user password (Step S196), and judges whether the read device password and the accepted password from the user are identical (Step S197).

When the controlling unit 104 judges that the two passwords are identical (Step S197), the controlling unit 104 outputs information that the password is verified (Step S198), and finishes the operation.

When the controlling unit 104 judges that the two passwords are not identical (Step S197), the controlling unit 104 outputs information that the password is not verified (Step S199), and finishes the operation.

(6) Search Operation

Figure 15:
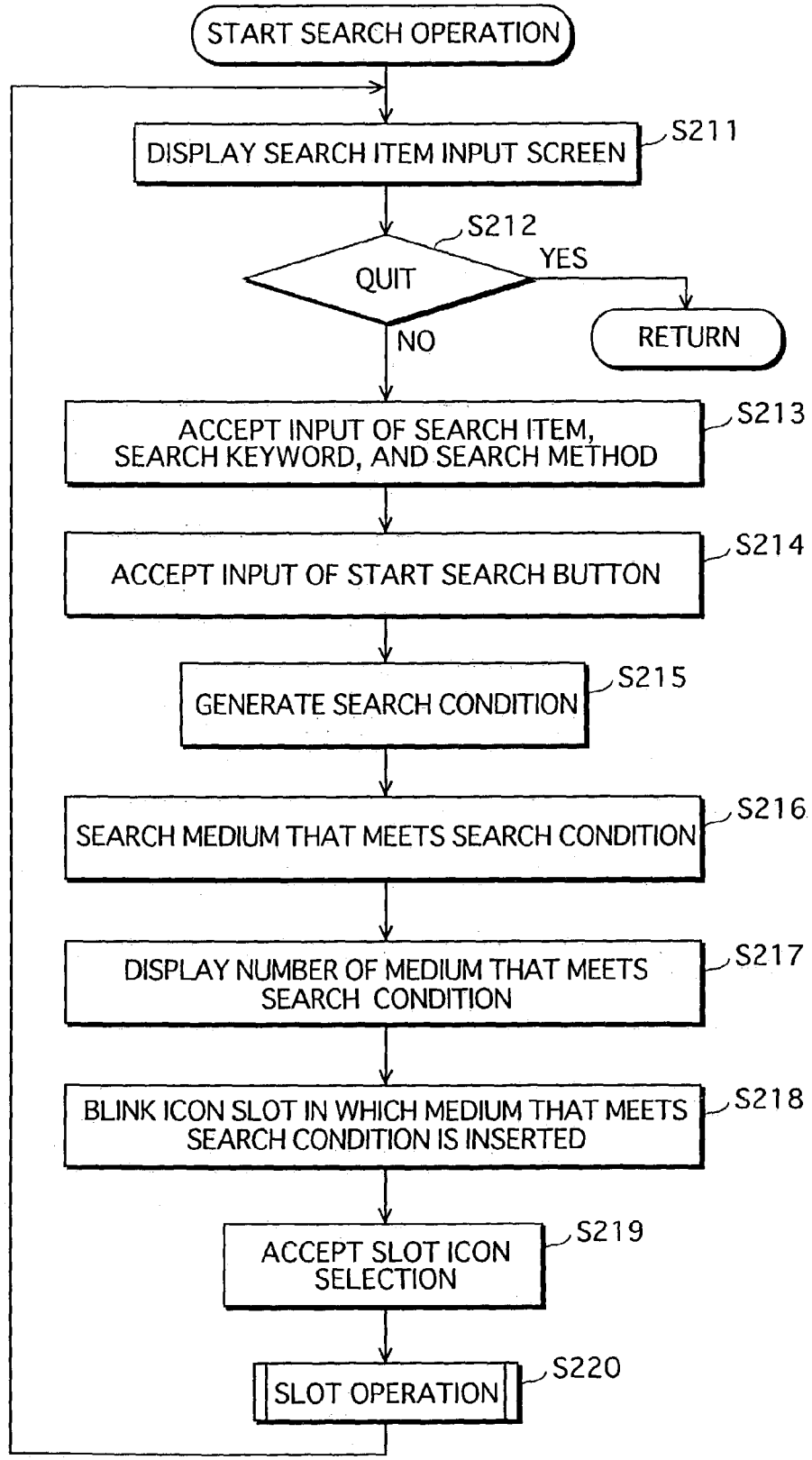
FIG. 15 is a flow chart showing an operation of a search process.

An explanation of a search operation is given in accordance with a flow chart shown in FIG. 15. The sequence explained below is a detail of Step S105 in the flow chart in FIG. 9.

The controlling unit 104 generates the search item input screen 171f and outputs the generated search item input screen 171f to the displaying unit 102, and the displaying unit 102 receives the search item input screen 171f and displays the received search item input screen 171f (Step S211).

Next, when the controlling unit 104 receives information indicating the termination of the search operation from either the input unit 101 or the displaying unit 102 (Step S212), the controlling unit 104 finishes the search operation.

In other cases (Step S212), the controlling unit 104 accepts inputs of a search item, a search keyword, and a search method (Step S213), accepts an input of the search start button 171g by the user from the input unit 101 or the displaying unit 102 (Step S214), generates the search condition using the accepted search item, search keyword, and search method (Step S215), searches for the memory card storing information that matches the generated search condition (Step S216), and outputs a result of the search, which is the number of memory cards satisfying the condition, to the displaying unit 102. The displaying unit 102 receives the result of the search, and displays the received result in the result displaying area 171i (Step S217).

Next, the controlling unit 104 displays the slot icon corresponding to the card connecting unit, in which the memory card that matches the search condition is inserted, blinking. In other words, the slot icons I101 and I102 are displayed alternately every 0.5 seconds (Step S218).

Then, the controlling unit 104 accepts a selection of the slot icon from the input unit 101 or the displaying unit 102 (Step S219), and performs the slot operation for the accepted slot icon (Step S220). Next, the controlling unit 104 goes back to Step S211 and repeats the operation.

The slot operation in Step S220 is the same as the operation in Step S104 in the flow chart shown in FIG. 9.

(7) Memory Card Ejection Operation

The memory card is pulled out from the memory card holder in the following manner.

Ejection of the memory card from the memory card holder is carried out, as explained below, either by operating icons or by pressing an eject button for the memory card on the memory card holder. A mechanism of the ejection of the memory card by using the eject button is the same as a conventional mechanism of the ejection of a PC card from a laptop computer.

The ejection by operating icons is as follows.

An icon indicating a trash bin is displayed on the liquid crystal display unit. By dragging the memory card icon and dropping it into the trash bin, it is possible to eject the corresponding memory card. A mechanism of the ejection of the memory card by icons is also the same as a conventional mechanism of the ejection of the PC card from the laptop computer When the memory card to be ejected requires the user to enter the password before ejection of the memory card, regardless of the password type that the memory card requires, the memory card holder requests the user to enter the password. If the password that the user enters is not identical to the medium password or the device password, the memory card is locked so that it cannot be ejected. This function is provided in order to prevent a third party from obtaining the memory card illegally.

1.5 Modified Examples

In the above explanation, the details about the memory card holder 10 have been given. However, the present invention is not restricted to the above embodiment, and the following examples may also be included.

(1) Memory Card Holder 100b

A memory card holder 100b has the same internal construction as the memory card holder 10, but an appearance of the memory card holder 100b is different from the memory card holder 10.

Figure 16:
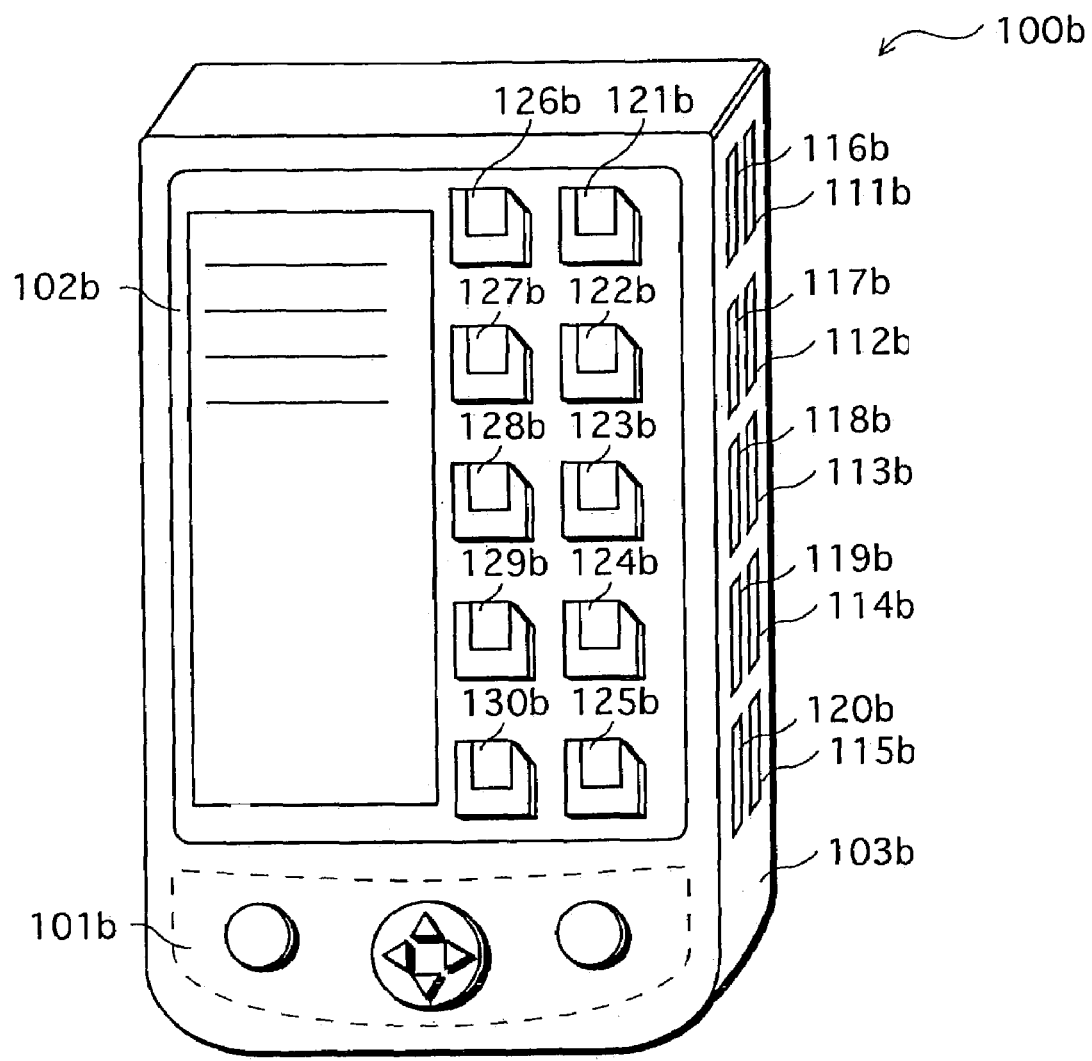
FIG. 16 shows an outside view of a memory card holder 100b.

The memory card holder 100b includes a displaying unit 102b and an input unit 101b on the front part, as shown in an outside view in FIG. 16. On a side unit 103b, five card connecting units 111b–115b and five card connecting units 116b–120b are disposed along a lengthwise direction.

Further, in an area closer to the side unit 103b in the displaying unit 102b, five slot icons 121b–125b and five slot icons 126b–130b are displayed along the lengthwise direction each in parallel.

The 5 card connecting units 111b–115b each correspond to the slot icons 121b–125b. The 5 card connecting units 116b–120b each correspond to the slot icons 126b–130b (2) The memory card holder 10 connects to a web server via the Internet. The web server stores slot icons having a variety of shapes in advance. According to the user request, the memory card holder 10 obtains a slot icon that the user requests from the web server via the Internet, and writes the obtained slot icon in the information storing unit 105. The slot icon obtained via the Internet and written in the information storing unit 105 is used by the memory card holder 10 as the slot icon indicating that the memory card is inserted in place of the slot icon I102 or the slot icon that the memory card stores specifically.

(3) In the first embodiment and in the modified example (1), the explanations are given to independent type memory card holders. The present invention, however, is not restricted to the above examples. The present invention may also be a compound type having functions explained in the first embodiment, such as a cell phone with an additional function, for example.

(4) While the example in which the password is used in the authentication is illustrated in the first embodiment, the present invention is not restricted to the above example. For example, in place of the password authentication, a biometric authentication system can be employed. Further, in place of the device password, an authentication device can be applied. In this case, the authentication device can be attached to the memory card holder, and the memory card holder can be used only when the authentication device is attached.

2. Second Embodiment

An explanation about an extracting apparatus 50 as another embodiment of the present invention is given below.

2.1 Extracting Apparatus 50

The extracting apparatus 50 enables the user to check information stored in the memory cards without inserting the memory cards inside the extracting apparatus 50 and to extract a specified card that the user desires from more than one memory card.

Figure 17:
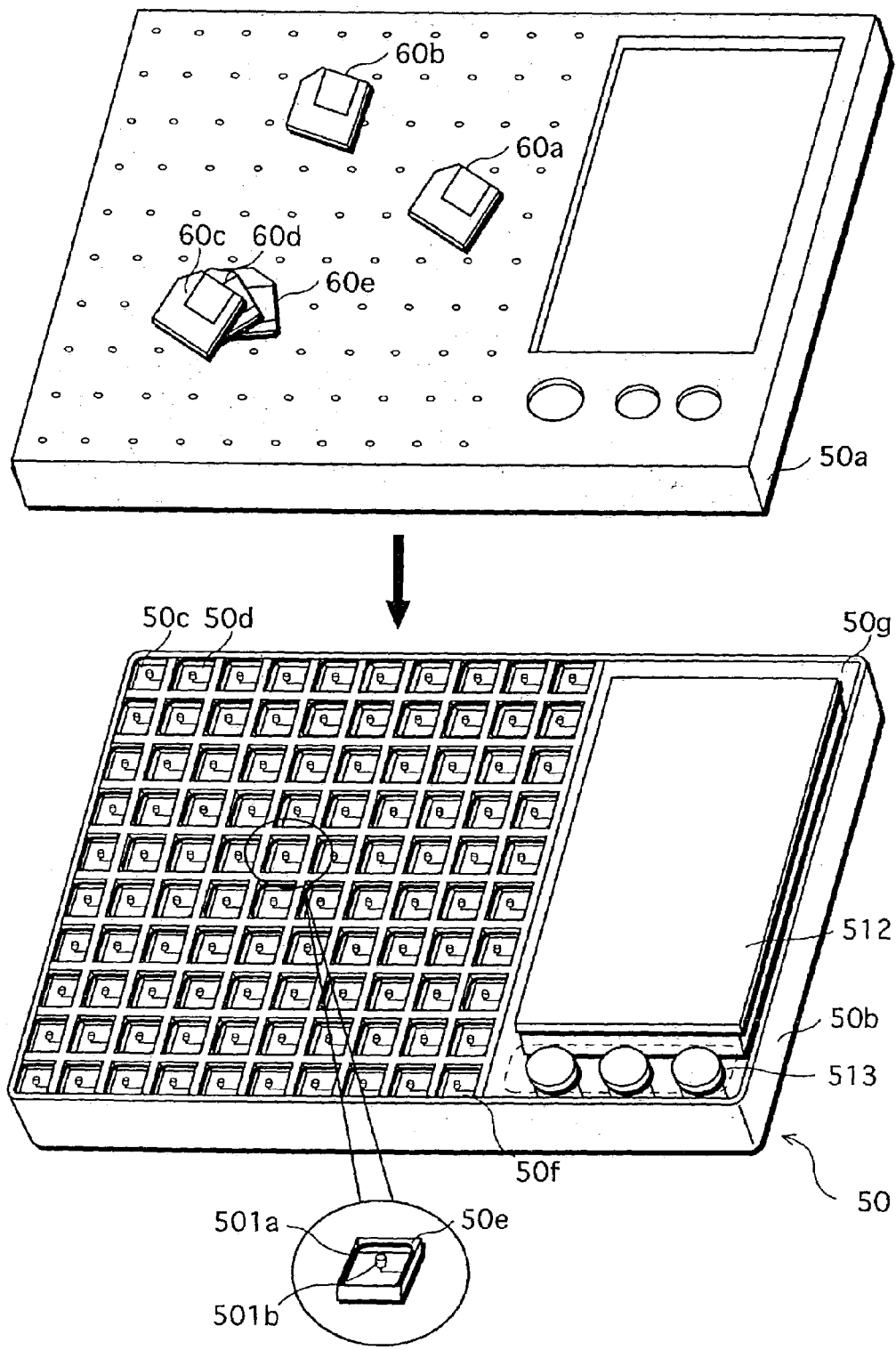
FIG. 17 shows an exploded view of an extracting apparatus 50.

FIG. 17 shows an exploded view of the extracting apparatus 50 before being assembled. The extracting apparatus 50, as shown in FIG. 17, includes a covering unit 50a and a main body 50b. The covering unit 50a is placed so as to cover the main body and adhered thereto.

The main body 50b includes 100 communicating chambers 50c, 50d, . . . , 50e, . . . , and 50f, and a, controlling chamber 50g. The 100 communicating chambers 50c, 50d, . . . , 50e, . . . , and 50f are each disposed at a corresponding position to each element in a 10×10 matrix.

The 100 communicating chambers 50c, 50d, . . . , 50e, . . . , and 50f are separated by partition boards disposed such that a set of nine partition boards are equally spaced in parallel and another set of nine partition boards are also equally spaced in parallel, orthogonal to the first set of the nine partition boards. A space between two adjacent partition boards is about 30 mm.

The communicating chamber 50e forms a rectangle that is about 30 mm both in a width and a length, and about 20 mm in a height. In the communicating chamber 50e, an antenna 501a formed in a loop coil is disposed so that a direction of a magnetic flux generated when electric current flows in the antenna 501a becomes vertical to a bottom surface of the main body 50b. Further, a light-emitting diode (LED) 501b is disposed in a center of the communicating chamber 50e so that an optical axis becomes vertical to the bottom surface of the main body 50b, and so that light emitted from the LED 501b is irradiated on an opposite side to the bottom surface of the main part. As in the communicating chamber 50e, an antenna and a LED are disposed in, each of the rest of the communicating chambers.

A displaying unit 512, an input unit 513, and a controlling unit 511 are disposed in the controlling chamber 50g.

The covering unit 50a includes round openings, each being about 5 mm in a diameter, at corresponding positions to each of the centers of the communicating chambers, so that beams from the LED are emitted outside through the openings of the extracting apparatus 50. Further, the covering unit 50a includes openings each having the same shape as the displaying unit 512 and the input unit 513 at positions corresponding to the displaying unit 512 and the input unit 513.

On the upper surface of the covering unit 50a, the user places memory cards 60a–60e. When the memory cards are placed, the extracting apparatus 50 reads information from the memory cards and displays the information read out, by communicating with each of the memory cards placed thereon using radio wave. Further, the LEDs in a vicinity of the memory card emit light so that the user knows from which memory card the displayed information is read. In addition, the user knows correspondence between the displayed information and the memory card by the light emitted from the read out memory card itself, vibration thereof, or sound made thereby.

Figure 18:
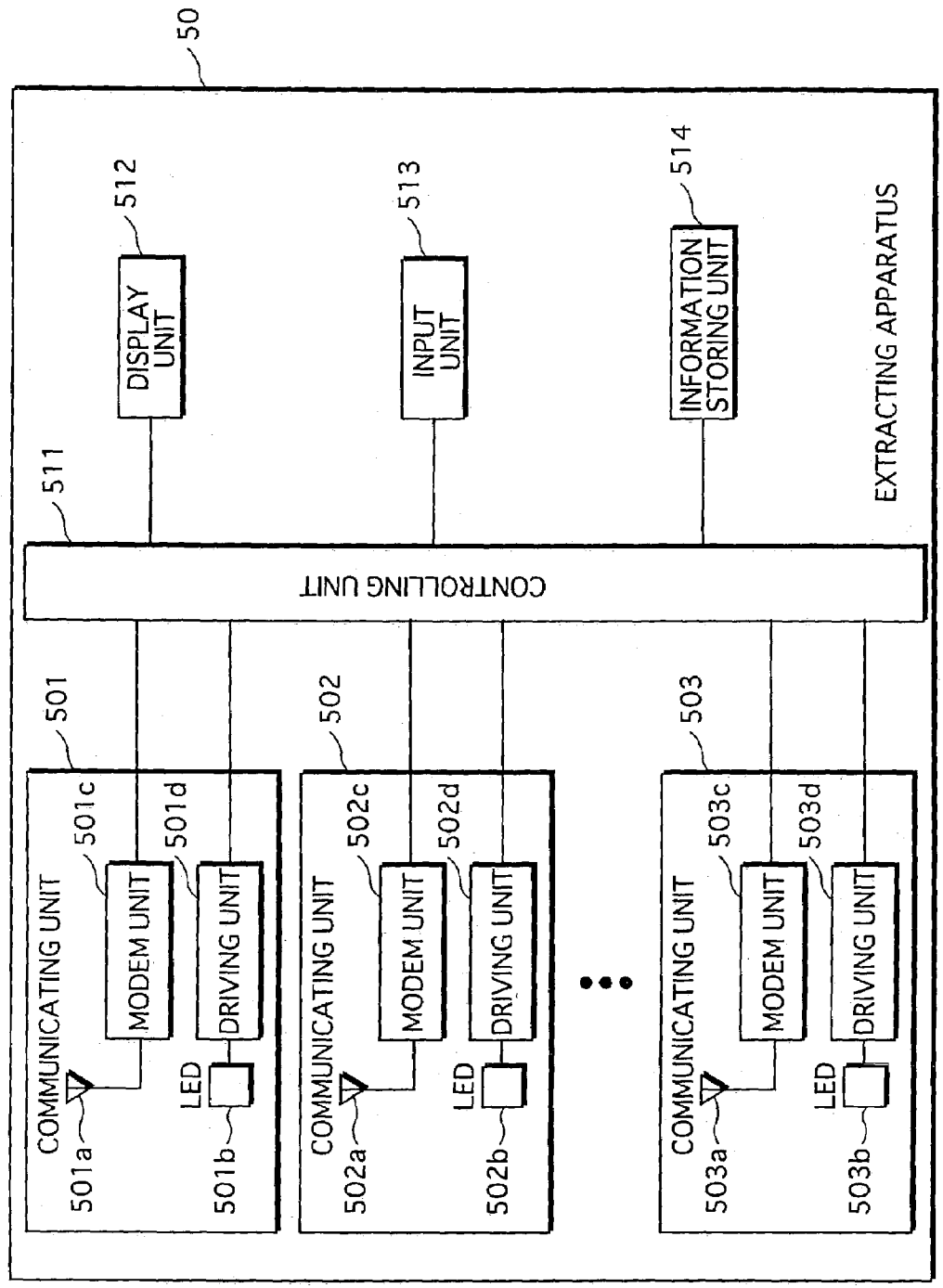
FIG. 18 is a block diagram illustrating a construction of the extracting apparatus 50.

As shown in FIG. 18, the extracting apparatus 50 includes the controlling unit 511, the displaying unit 512, the input unit 513, the information storing unit 514, and 100 communicating units 501, 502, . . . , and 503.

(1) Displaying Unit 512

The displaying unit 512 has substantially the same construction as the displaying unit 102 of the memory card holder 10 of the first embodiment, and has a dual structure with a liquid crystal panel and a touch panel. Further, the displaying unit 512 displays the same screen as in the displaying unit 102.

(2) Input Unit 513

The input unit 513 has substantially the same construction as the input unit 101 of the memory card holder 10 of the first embodiment.

(3) Information Storing Unit 514

The information storing unit 514 has substantially the same construction as the information storing unit 105 of the memory card holder 10 of the first embodiment The information storing unit 514 further includes an ID correspondence table 521, as shown in an example of FIG. 19.

The ID correspondence table 521 has an area to store 100 sets each including a communicating unit ID, a medium ID and a mark.

The 100 sets each correspond to the 100 communicating units 501, 502, . . . , 503.

The communicating unit ID is an identifier to identify each of the communicating units 501, 502, . . . , and 503. Specifically, 100 communicating unit IDs "1", "2", "3", . . . , and "100" are assigned to the 100 communicating units 501, 502, . . . , and 503, respectively. Each of the 100 sets stores each of the 100 communicating unit IDs "1", "2", "3", . . . , and "100", respectively, in advance.

The medium ID is an identifier used to identify the memory card.

The mark indicates the communicating unit selected to perform communication with the memory card. In other words, the communicating unit that is indicated by the communicating unit ID in the set having the mark is selected.

(4) Communicating Unit 501

The communicating unit 501 includes the antenna 501a, the LED 501b, a modem unit 501c, and a driving unit 501d. Other communicating units also have the same structure, and therefore an explanation is only given to the communicating unit 501.

(Antenna 501a)

The antenna 501a is made of a conducting wire that is coiled a plurality of times in a loop coil shape, and connected to the modem unit 501c. The antenna 501a is for both transmission and reception.

The antenna 501a is a directional antenna that radiates radio waves to a specific direction. The antenna 501a receives carrier waves with signals from the modem unit 501c and radiates the carrier waves as radio waves. A range of radiation of the radio waves is approximately 30 mm from a center of the antenna 501a.

Further, the antenna 501a receives the radio waves and converts the received radio waves to electric signals, and outputs the electric signals to the modem unit 501c.

(Modem Unit 501c)

The modem unit 501c receives signals (pulsed signal wave) from the controlling unit 511. Upon receiving the signals, the modem unit 501c uses the received signals as modulation signals, and modulates amplitude of 2.4 GHz carrier waves, and outputs the modulated carrier waves to the antenna 501a.

The modem unit 501c further receives the electric signals from the antenna 501a, selects a signal having a 2.4 GHz wavelength, extracts pulsed signal waves from the selected signal, and then outputs the extracted pulsed signal waves to the controlling unit 511.

(Driving Unit 501d)

The driving unit 501d receives an instruction signal from the controlling unit 511, indicating an instruction of either emitting light or stopping emitting light. Upon receiving the instruction signal, the driving unit 501d controls driving of the LED 501b to either emit light or stop emitting light based on the received instruction signal.

(LED 501b)

The LED 501b is a light-emitting diode, and emits light or stops emitting light under control of the driving unit 501d.

(5) Controlling Unit 511

The controlling unit 511 specifically includes a microprocessor, a ROM, a RAM, and such. The RAM stores a computer program. By the microprocessor operated according to the computer program, the controlling unit 511 achieves its function.

The operation of the controlling unit 511 is explained later.

2.2 Memory Card 60

All of the memory cards 60a–60e have the same construction. Therefore, an explanation here is given to a memory card 60 as an example.

Figure 20:
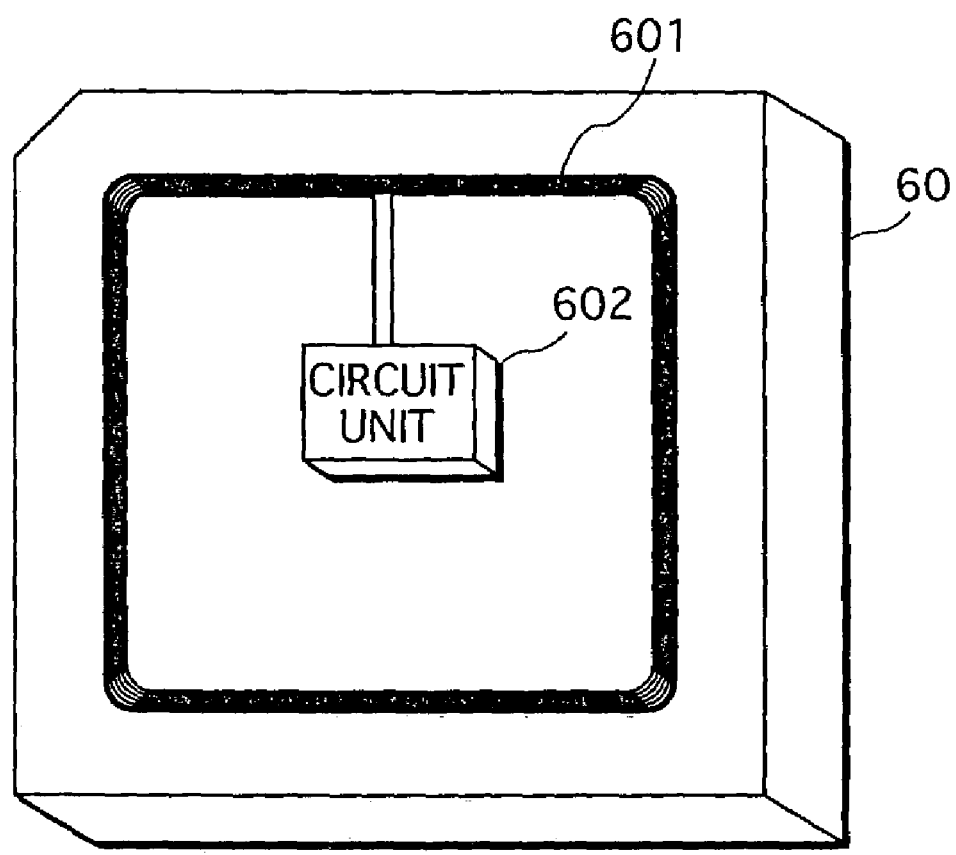
FIG. 20 shows an outside view of the memory card 60; an antenna 601 and a circuit 602 are enclosed in the memory card 60, and cannot be seen from outside; in this drawing, the antenna 601 and the circuit 602 are shown for the purpose of explanation.

As shown in an outside view of FIG. 20, the memory card 60 includes an antenna 601 and a circuit unit 602 enclosed in a resin formed in a plate shape that is 30 mm long, 30 mm wide, and 0.5 mm thick. A range within which the memory card 60 can communicate is approximately 30 mm, and the communication speed is 10–20 msec/byte.

Figure 21:
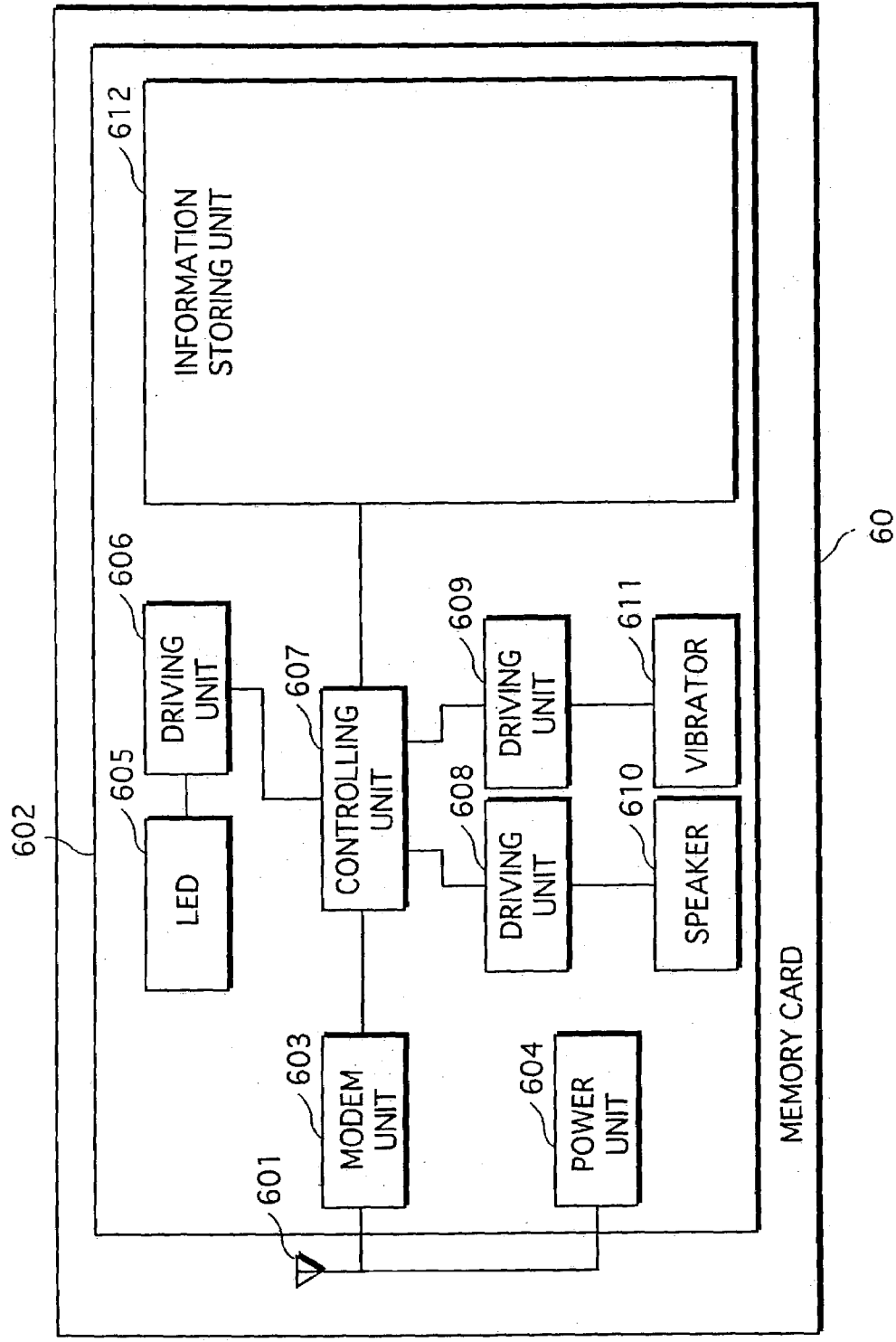
FIG. 21 is a block diagram illustrating a construction of a memory card 60.

As shown in FIG. 21, the memory card 60 includes the antenna 601 and the circuit unit 602, and the circuit unit 602 includes a modem unit 603, a power unit 604, an LED 605, a driving unit 606, a controlling unit 607, a driving unit 608, a driving unit 609, a speaker 610, a vibrator 611, and information storing unit 612.

(1) Antenna 601

The antenna 601 has substantially the same construction as the antenna 501a; the antenna 601 is made of a conducting wire that is coiled a plurality of times in a loop coil shape, and connected to the modem unit 603 and the power unit 604. The antenna 601 is for both transmission and reception.

The antenna 601 is a directional antenna that radiates radio waves in a specific direction. The antenna 601 receives carrier waves with signals from the modem unit 603 and radiates the carrier waves as radio waves. A range of radiation of the radio waves is approximately 30 mm from a center of the antenna 601.

Further, the antenna 601 receives the radio waves and converts the received radio waves to electric signals, and outputs the electric signals to the modem unit 603 and the power unit 604.

(2) Power Unit 604

The power unit 604 is connected to the antenna 601 and receives the electric signals from the antenna 601, and stores the received electric signals as electric charges. The power unit 604 further supplies electricity to each component part of the memory card 60.

(3) Driving Unit 606

The driving unit 606 receives an instruction signal from the controlling unit 607, indicating an instruction of either emitting light or stopping emitting light. Upon receiving the instruction signal, the driving unit 606 controls driving of the LED 605 to either emit light or stop emitting light based on the received instruction signal.

(4) LED 605

The LED 605 is a light-emitting diode, and emits light or stops emitting light under control of the driving unit 606.

(5) Driving Unit 608

The driving unit 608 receives an instruction signal from the controlling unit 607, indicating an instruction of either outputting sound or stopping sound output. Upon receiving the instruction signal, the driving unit 608 outputs a sound signal with a specified frequency to the speaker 610 based on the received instruction signal.

(6) Speaker 610

The speaker 610 receives the sound signal from the driving unit 608, then converts the sound signal into sound and outputs the sound.

(7) Driving Unit 609

The driving unit 609 receives an instruction signal from the controlling unit 607, indicating an instruction of either starting or stopping of vibration. Upon receiving the instruction signal, the driving unit 609 controls driving of the vibrator 611 to either start or stop vibration based on the received instruction signal.

(8) Vibrator 611

The vibrator 611 starts or stops vibration under control of the driving unit 609.

(9) Information Storing Unit 612

The information storing unit 612 includes a general area and a system area. The general area and the system area store the same kind of information as the information stored in the general area 221 and the system area 223 of the information storing unit 203 of the memory card 21.

(10) Controlling Unit 607

The controlling unit 607 specifically includes a microprocessor, a ROM, a RAM, and such. The RAM stores a computer program. By the microprocessor operated according to the computer program, the controlling unit achieves its function.

The operation of the controlling unit 607 is explained later.

2.3 Communication Method Between Extracting Apparatus 50 and Memory Card 60

An explanation is given about a communication method between the extracting apparatus 50 and the memory card 60 when the memory card 60 is placed on the extracting apparatus 50.

The communication between the extracting apparatus 50 and the memory card 60 is performed in three phases: (a)

power supply, (b) establishment of communication, and (c) data transmission and reception. An explanation is given to each phase below.

(a) Power Supply Phase

The controlling unit 511 of the extracting apparatus 50 instructs each communicating unit to output radio waves for power supply, and each communicating unit outputs the radio waves. In the memory card 60, the antenna 601 receives the radio waves, the power unit 604 stores electric charges and supplies electricity to each component part that forms the memory card 60.

Note that the power supply from the extracting apparatus 50 to the memory card 60 is performed not only in this phase, but also in the following phases.

(b) Establishment of Communication Phase

Each communicating unit of the extracting apparatus 50 communicates with up to 10 different memory cards via 10 time-shared communicating channels and a control channel in the same period of time. Each of the time-shared communicating channels and the control channel includes inbound and outbound channels. The inbound channel is only used for transmission of information to the extracting apparatus 50 from the memory card, and the outbound channel is only used for transmission of information from the extracting apparatus 50 to the memory card. Note that in an explanation below, the inbound and outbound channels are not specifically distinguished to make the explanation brief Each of the inbound and outbound channels has 50 msec of time width.

Via the control channel, one of the communicating units of the extracting apparatus 50 requests the medium ID from the memory card 60. The memory card 60 receives the request for the medium ID via the control channel.

Next, the memory card 60 generates one random integer number between 1 and 10, and selects one communicating channel indicated by generated random number. The communicating channel may also be selected using an integer value generated in such a manner that a hash function for generating an integer value between 1 and 10 is applied to the media ID stored in the information storing unit 612 of the memory card 60.

As has been explained in the above, the memory card selects one communicating channel using the randomly generated one integer value between 1 and 10, and therefore possibility of conflict among more than one memory card using the same channel in the same period of time decreases. Further, when the conflict among more than one memory card occurs, each memory card generates a different random number after a period of time which is indicated by the generated random number and selects one communicating channel using another random number generated again.

Next, the memory card 60 transmits, to the extracting apparatus 50 via the control channel, a channel identification number indicating the selected channel and the medium ID stored in the memory card 60. The extracting apparatus 50 receives the channel identification number and the medium ID via the control channel.

Note that, when one memory card is placed above more than one communicating chamber disposed close to each other, more than one communicating unit in the more than one communicating chamber is to communicate with the memory card. In this case, the extracting apparatus 50 selects one communicating unit that communicates with the memory card. A detail about the selection method of one communicating unit is explained later.

As explained in the above, the communicating channel between the memory card and the extracting apparatus 50 is established.

(c) Data Transmission And Reception Phase

The memory card 60 and the extracting apparatus 50 perform data transmission and reception via the communication channel identified by the channel identification number.

As has been explained above, communication between the memory card and the extracting apparatus 50 is performed via the 10 time-shared communicating channels and the control channel. Accordingly, even when up to 10 different memory cards are placed overlapping each other on the extracting apparatus 50, the extracting apparatus 50 is operable to communicate with each of the memory cards.

2.4 Operation of Communication Between Extracting Apparatus 50 and Memory Card 60

Figure 22:
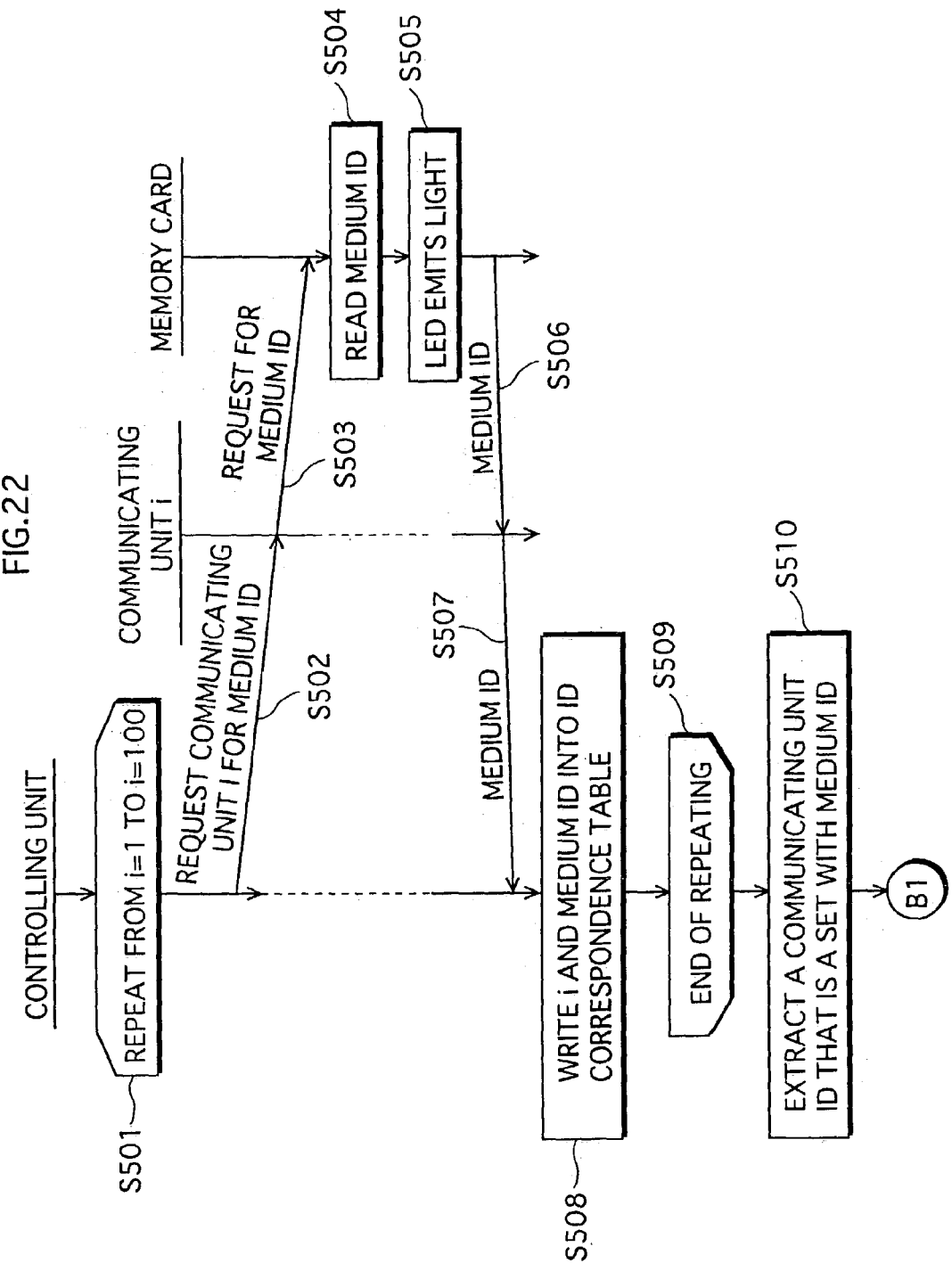
FIG. 22 is a flow chart showing an operation of communication between the extracting apparatus 50 and the memory card 60 when the memory card 60 is placed on the extracting apparatus 50; continues to FIG. 23.
Figure 23:
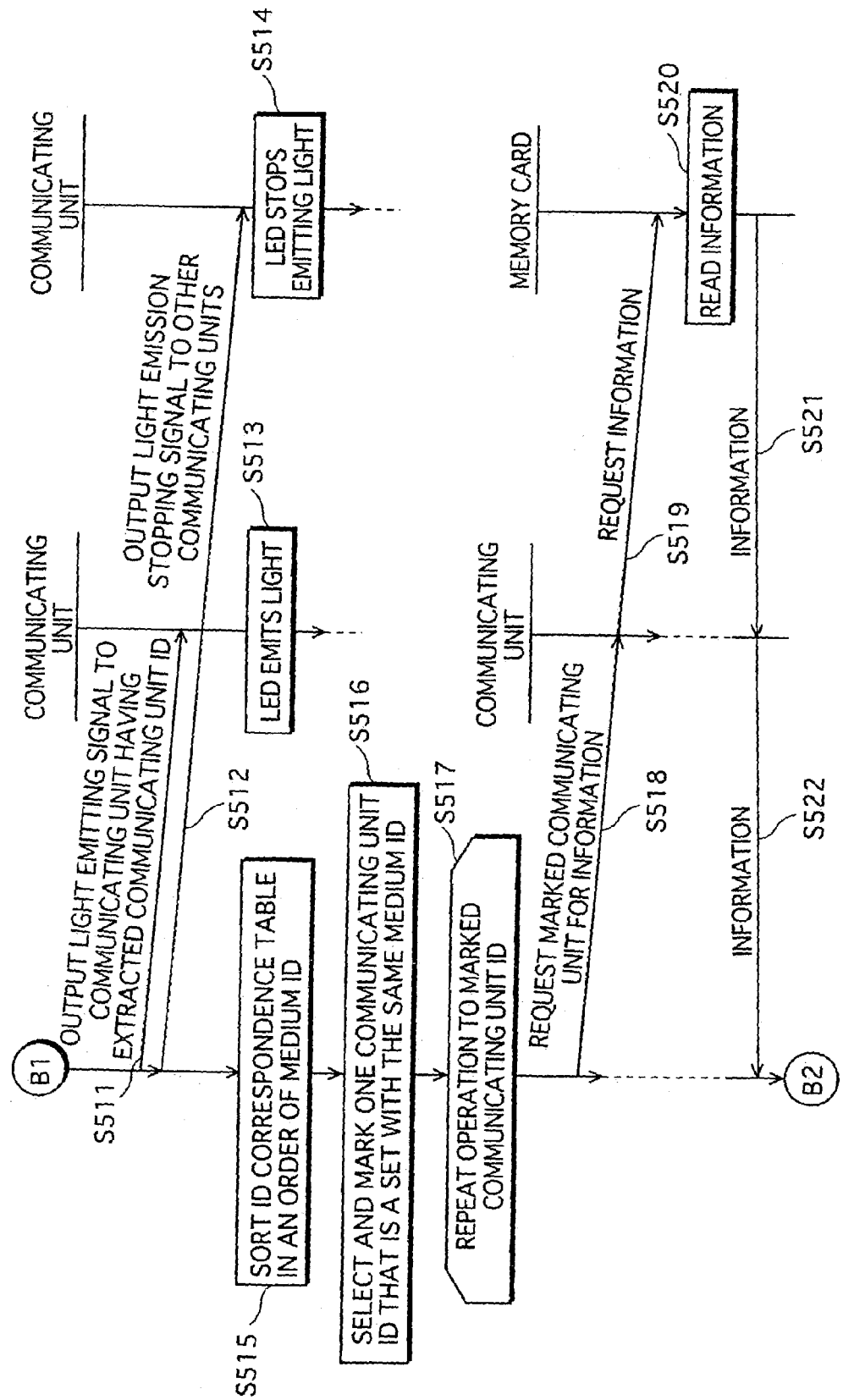
FIG. 23 is a flow chart showing an operation of communication between the extracting apparatus 50 and the memory card 60 when the memory card 60 is placed on the extracting apparatus 50; continues to FIG. 24.
Figure 24:
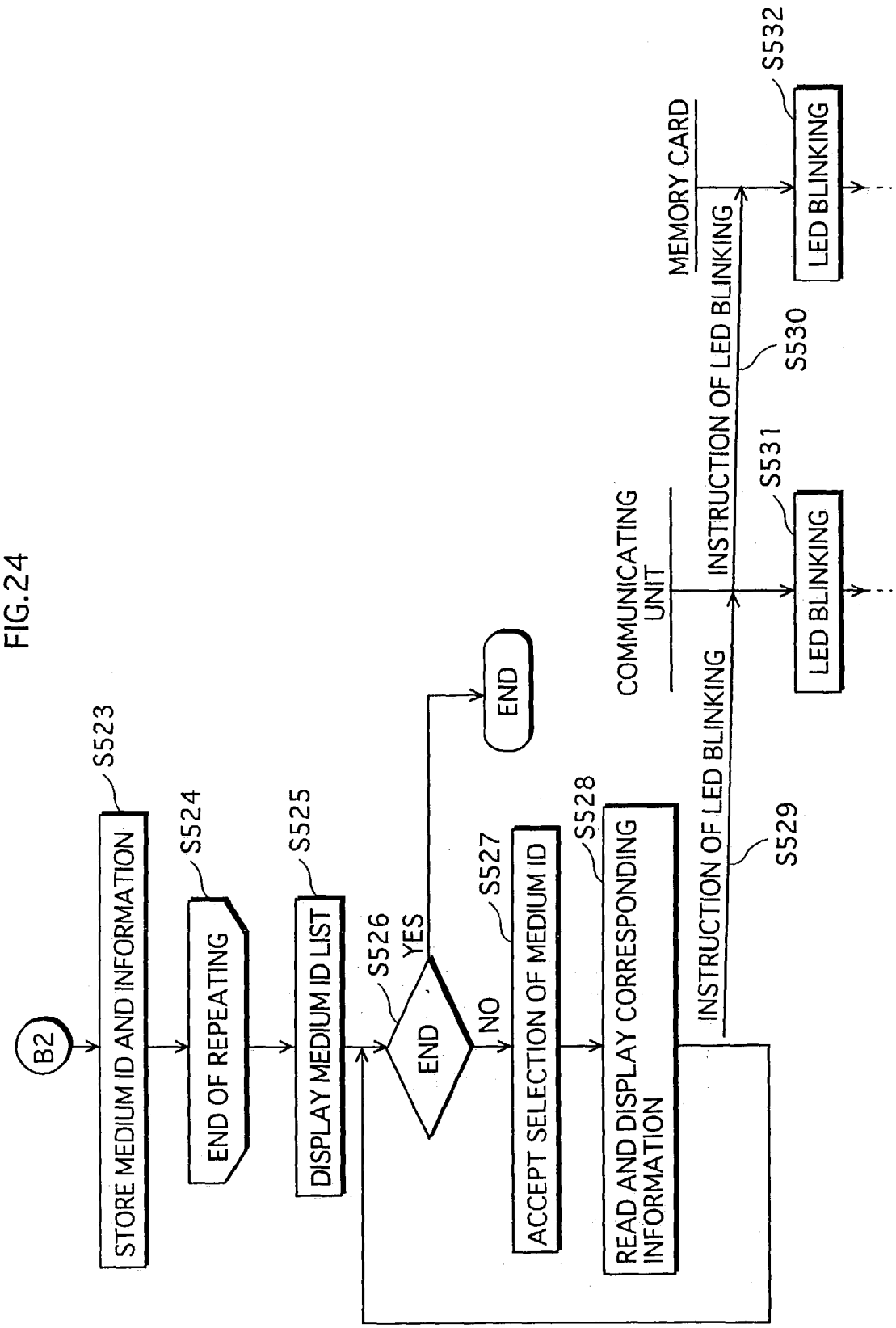
FIG. 24 is a flow chart showing an operation of communication between the extracting apparatus 50 and the memory card 60 when the memory card 60 is placed on the extracting apparatus 50; continued from FIG. 23.

An explanation about an operation of the communication between the extracting apparatus 50 and the memory card 60 when a memory card 60 is placed on the extracting apparatus 50 is given below in accordance with flow charts in FIGS. 22–24.

The controlling unit 511 of the extracting apparatus 50 repeats Steps S501–S509 for the same number of times as the number of communicating units in the extracting apparatus 50. In other words, the controlling unit 511 repeats the Steps S501–S509 100 times. In the repetition, the controlling unit 511 shifts the variable i from 1, 2, 3, . . . , to 100.

The controlling unit 511 outputs a request instruction for requesting the communicating unit indicated by the variable i for the medium ID (Step S502), the communicating unit indicated by the variable i transmits the request instruction via the electronic waves (Step S503). The controlling unit 607 of the memory card 60 receives the request instructions via the antenna 601 and the modem unit 603 (Step S503), reads out the medium ID stored therein (Step S504), and controls the driving unit 606 so that the LED 605 emits light, and the LED 605 emits light (Step S505). Next, the controlling unit 607 transmits the read out medium ID via the modem unit 603 and the antenna 601 using the electronic waves (Step S506). The communicating unit receives the medium ID and outputs the received medium ID to the controlling unit 511 (Step S507), and the controlling unit 511 takes the variable i as a communicating unit ID, and writes a set including the received medium ID and the communicating unit ID in the ID correspondence table 521 (Step S508).

As shown in the above, the set including the medium ID, for identifying the memory card that communicates with each communicating unit, and the communicating unit ID, for identifying the communicating unit, is stored in the ID-correspondence table 521.

Next, the controlling unit 511 extracts all of the communicating unit IDs that each correspond to and form a set with each of the medium IDs (Step S510). The controlling unit 511, then, outputs a light emitting signal to the communicating units having the extracted communicating unit IDs so that the LEDs of the communicating units emit lights (Step S511), and each of the corresponding communicating units makes the LED emit light (Step S513). Further, the controlling unit 511 outputs a light emission stopping signal to the communicating units not having the extracted communicating unit IDs so that the LEDs of the communicating units stop emitting light (Step S512), and the corresponding communicating units make the LEDs stop emitting light if the light has been emitted (Step S514).

As explained above, the communicating units in the vicinity of the memory card make the LEDs emit light, and the rest of the communicating units make the LEDs stop emitting light if the LEDs have emitted light.

Next, the controlling unit 511 sorts the sets stored in the ID correspondence table 521 in an order of the medium ID, and generates a temporary table containing the sorted sets (Step S515), attaches a mark to one set selected from one or more sets having the same medium ID (Step S516). When more than one set has the same medium ID, it indicates that one memory card is placed on more than one communicating chamber that are adjacent to each other, and the more than one communicating unit placed on the communicating chambers is to communicate with the memory card. In this case, the more than one set each includes the same memory card medium ID and the communicating unit ID of each communicating unit. One communicating unit is selected to communicate with the memory card, when the communicating unit is identified by the communicating unit ID included in the set having the mark.

Next, the controlling unit 511 repeats Steps from S517 to S524 to the communicating unit identified by the communicating unit ID included in the set having the mark.

The controlling unit 511 outputs an information request to the marked communicating unit (Step S518), and the marked communicating unit transmits the information request via the radio waves (Step S519). The controlling unit 607 of the memory card receives the information request via the antenna 601 and the modem unit 603 (Step S519), reads the requested information from the information storing unit 612 (Step S520), and transmits the read out information via the modem unit 603 and the antenna 601 (Step S521). The marked communicating unit receives the information (Step S521), and outputs the received information to the controlling unit 511 (Step S522). The controlling unit 511 writes, in the information storing unit 514, the received information with correspondence with the medium ID (Step S523).

As explained above, the controlling unit 511 reads information from all of the memory cards that are placed on the extracting apparatus 50, and writes the received information with correspondence with the medium ID in the information storing unit 514.

Next, the controlling unit 511 generates a medium ID list by extracting only the medium IDs from the sets each including the medium ID and the information in the information storing unit 514, and outputs the generated medium ID list to the displaying unit 512. The displaying unit 512 displays the medium ID list (Step S525).

When the extracting apparatus 50 accepts a quitting operation from the user through the displaying unit 512 and the input unit 513 (Step S526), the extracting apparatus 50 completes the operation and turns the power off.

Upon the acceptance of selection of the medium ID from the user through the displaying unit 512 or the input unit 513 (Step S527), the displaying unit 512 or the input unit 513 outputs the selected medium ID to the controlling unit 511. The controlling unit 511 receives the medium ID, reads information corresponding to the received medium ID from the information storing unit 514, and outputs the read out information to the displaying unit 512. The displaying unit 512 displays the information (Step S528).

The controlling unit 511 outputs, to the corresponding communicating unit, an instruction that the corresponding unit makes the LED blink and an instruction that the corresponding memory card makes the LED blink (Step S529). The communicating unit makes the LED blink (Step S531). Further, the communicating unit outputs, to the memory card, the instruction that the memory card makes the LED blink (Step S530). The memory card makes the LED blink, and vibrates the vibrator and makes the speaker output sounds (S532).

In the manner that has been described in the above, the information stored in the memory card selected by the user is displayed in the displaying unit 512, the LED of the memory card is made blinking, the vibrator of the memory card is made vibrating, and the speaker of the memory card is made outputting sounds, and the LEDs in the vicinity of the position where the memory card is placed are made blinking. In this way, the user knows the correspondence between the displayed information and the memory card.

2.5 Other Modified Examples

The explanation about the extracting apparatus 50 has been given in the above. The present invention, however, is not restricted to the above embodiment, and examples explained below are also included.

(1) The extracting apparatus 50 can also be such that, as has been explained in the first embodiment, the extracting apparatus 50 accepts an input of the search condition about the memory card desired by the user, identifies the memory card that satisfies the accepted search condition among more than one memory cards placed on the extracted apparatus 50, makes the LED of the identified memory card emit light, and makes the LED of the extracting apparatus 50 in the vicinity of the identified memory card emit light.

(2) While each communicating unit in the above extracting apparatus 50 is disposed in each of the communicating chambers formed by the partition boards that cross each other orthogonally, examples below are also possible.

Figure 25A:
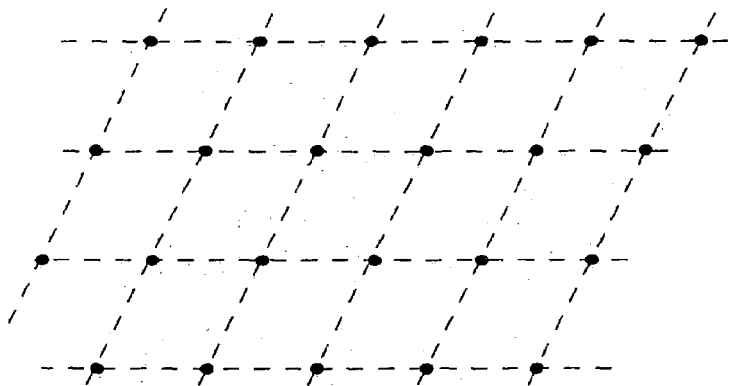
FIG. 25 shows shapes of communicating chambers:
 (a) parallelogram
 (b) equilateral triangle, and
 (c) honeycomb.

The communicating chambers can be parallelograms as shown in FIG. 25(a) formed by a plurality of partition boards that are placed parallel to each other and another plurality of partition boards that are placed parallel to each other and in an angle of 120° to the former plurality of partition boards. The antenna and the LED are placed in the center of each of the communicating chambers formed in this way. Dashed lines in FIG. 25(a) indicate positions that the partition boards are placed. Note that the angle is not limited to 120° and can be different.

Figure 25B:
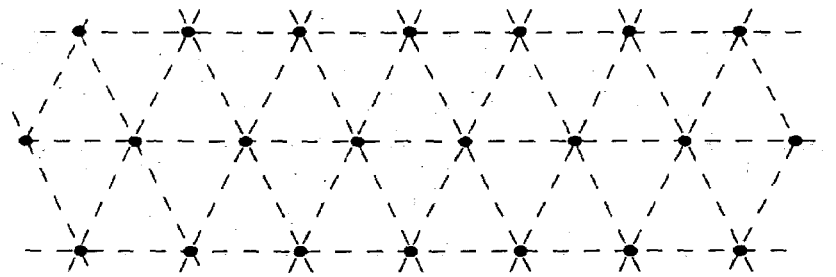

The communicating chambers can be equilateral triangles, as shown in the FIG. 25(b), formed by a first plurality of partition boards that are placed parallel to each other, a second plurality of partition boards that are placed parallel to each other and in an angle of 120° to the first plurality of partition boards, and a third plurality of partition boards that are placed parallel to each other and in an angle of 60° to the first plurality of partition boards. The antenna and the LED are placed in the center of each of the communicating chambers formed in this way. Dashed lines in FIG. 25(b) indicate positions that the partition boards are placed.

Figure 25C:
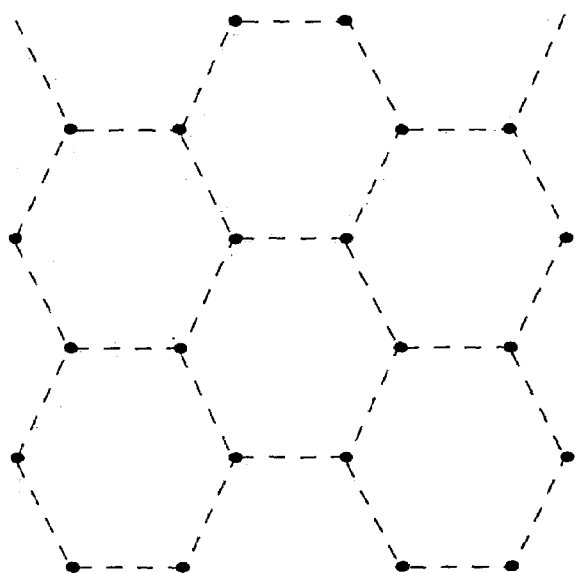

The communicating chambers can also be hexagons, as shown in FIG. 25(c), formed by a plurality of partition boards that are placed in a honey comb shape. The antenna and the LED are placed in the center of each of the communicating chambers formed in this way. Dashed lines in FIG. 25(c) indicate positions that the partition boards are placed.

(3) Although the extracting apparatus 50 described above does not specify positions that the memory cards are to be placed on an upper surface of the extracting apparatus and reads information from the memory cards that the user freely place, an example explained below is also possible.

Figure 26:
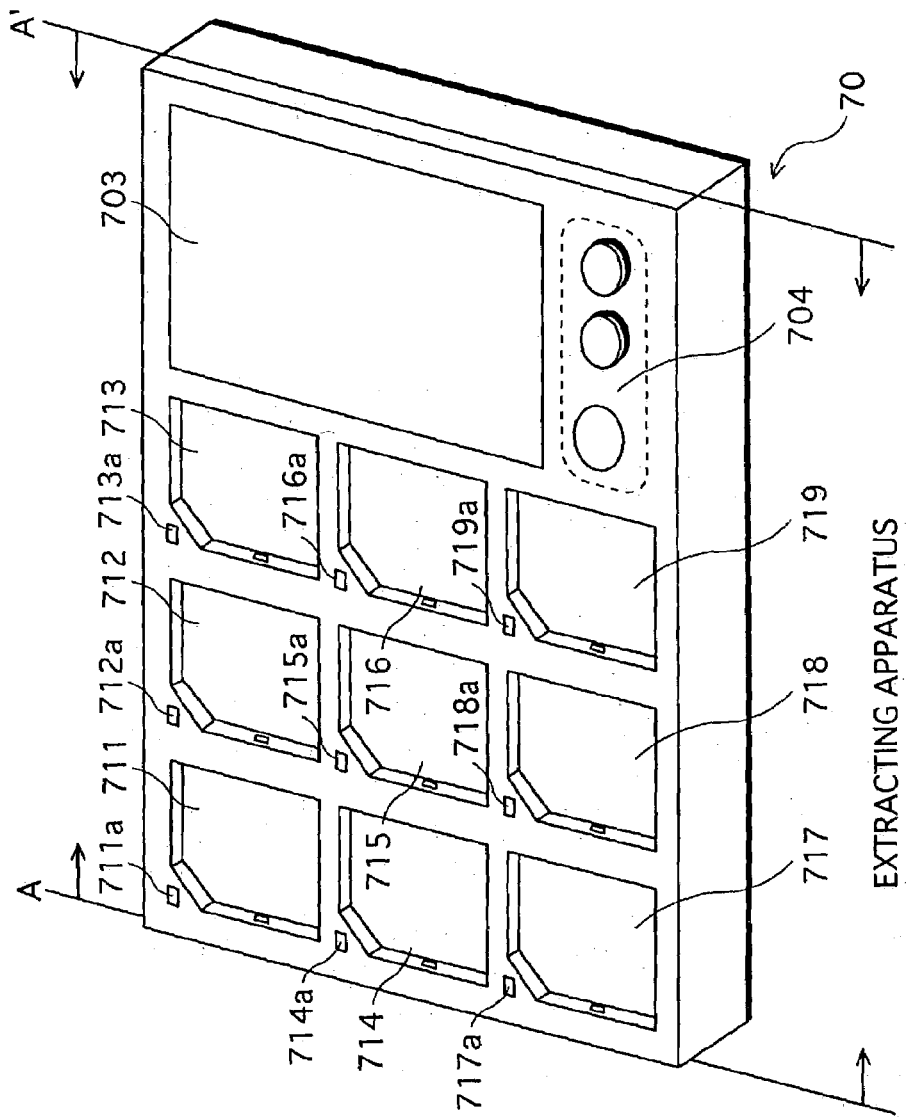
FIG. 26 shows an outside view of an extracting apparatus 70.

As shown in FIG. 26, the extracting apparatus 70 includes nine concave parts 711–719 on the upper surface thereof at positions corresponding to each element in a 3×3 matrix. The concave parts 711–719 are each formed in a shape similar to the memory card and are each capable of holding one memory card. The user places the memory card in each of the concave parts. In addition, nine LEDs 711a–719a each corresponding to the concave parts 711–719 are disposed on the convex part on the upper surface except for the concave parts of the extracting apparatus 70.

Figure 27:
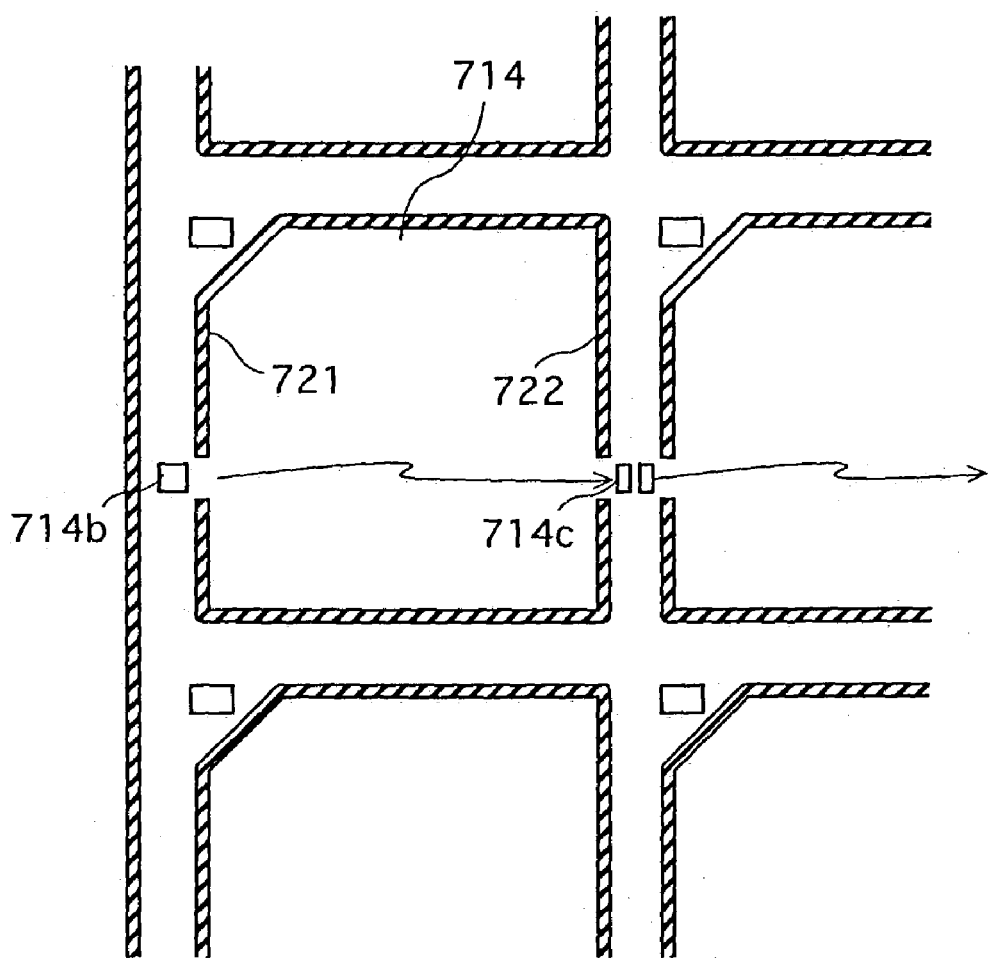
FIG. 27 is a partial cross sectional view taken at line A–A' of the extracting apparatus 70.

Moreover, as shown in FIG. 27, a side surface 721 of the concave part 714 and a side surface 722 facing the side surface 721 have penetrating holes 731 and 732, respectively, and a light emitting element 714b is provided in the side surface 721, and a light receiving element 714c is provided in the side surface 722. The light emitting element 714b irradiates light to the light receiving element 714c through the penetrating holes 731 and 732. Under the bottom surface of the concave part 714, the communicating unit containing a coil shaped antenna is disposed.

FIG. 27 shows a cross-sectional view of the extracting apparatus 70 taken at a line between a bottom surface of the concave part 714 and the upper surface of the extracting apparatus, and that is parallel to the bottom surface of the concave part 714.

All the concave parts have the same structure as the concave part 174. Other than what has been explained here, the extracting apparatus 70 has the same construction as the extracting apparatus 50.

When the user places the memory card so as to be held in the concave part 714, the light receiving element 714c detects that the light irradiated from the light emitting element 714b is blocked, and outputs, to the controlling unit, a signal indicating that the light is blocked. Upon reception of the signal, the controlling unit recognizes that the concave part 714 holds the memory card and controls the communicating unit disposed under the bottom surface of the concave part 714 to start communicating with the memory card.

In this way, the extracting apparatus 70 detects the memory card held in the concave part. Through communication between the extracting apparatus 70 and the detected memory card via the communicating unit disposed under the bottom surface of the concave part, the memory card reads information and the extracting apparatus 70 stores and displays the read out information.

(4) The extracting apparatus may also have a construction described below.

A bar code is printed on the surface of the memory card 60. The bar code represents the medium ID that is stored in the memory card.

A bar-code reader includes a bar-code reading unit for reading the bar-code optically and converting the read bar-code into the original medium ID, a communicating unit for identifying the memory card that stores the medium ID using the medium ID generated by the conversion and for reading the information from the identified memory card via the radio waves, and a displaying unit for displaying the information read from the memory card.

(5) The medium ID, title information, a remaining capacity of the memory card, and such, are included in the information obtained from the memory card and displayed.

(6) It is also possible that electronic cards are placed in an apparatus that is also a card container. The apparatus accepts a search condition such as "a card with a large capacity" from the user through a menu, extracts an electronic card that satisfies the search condition, and makes the extracted electronic card emit light.

3. Other Modified Examples

Although the present invention has been explained in reference with the above embodiments, the present invention is not restricted to the above embodiments and examples below are included in the present invention.

(1) The memory card holder may have a structure described below.

Figure 28:
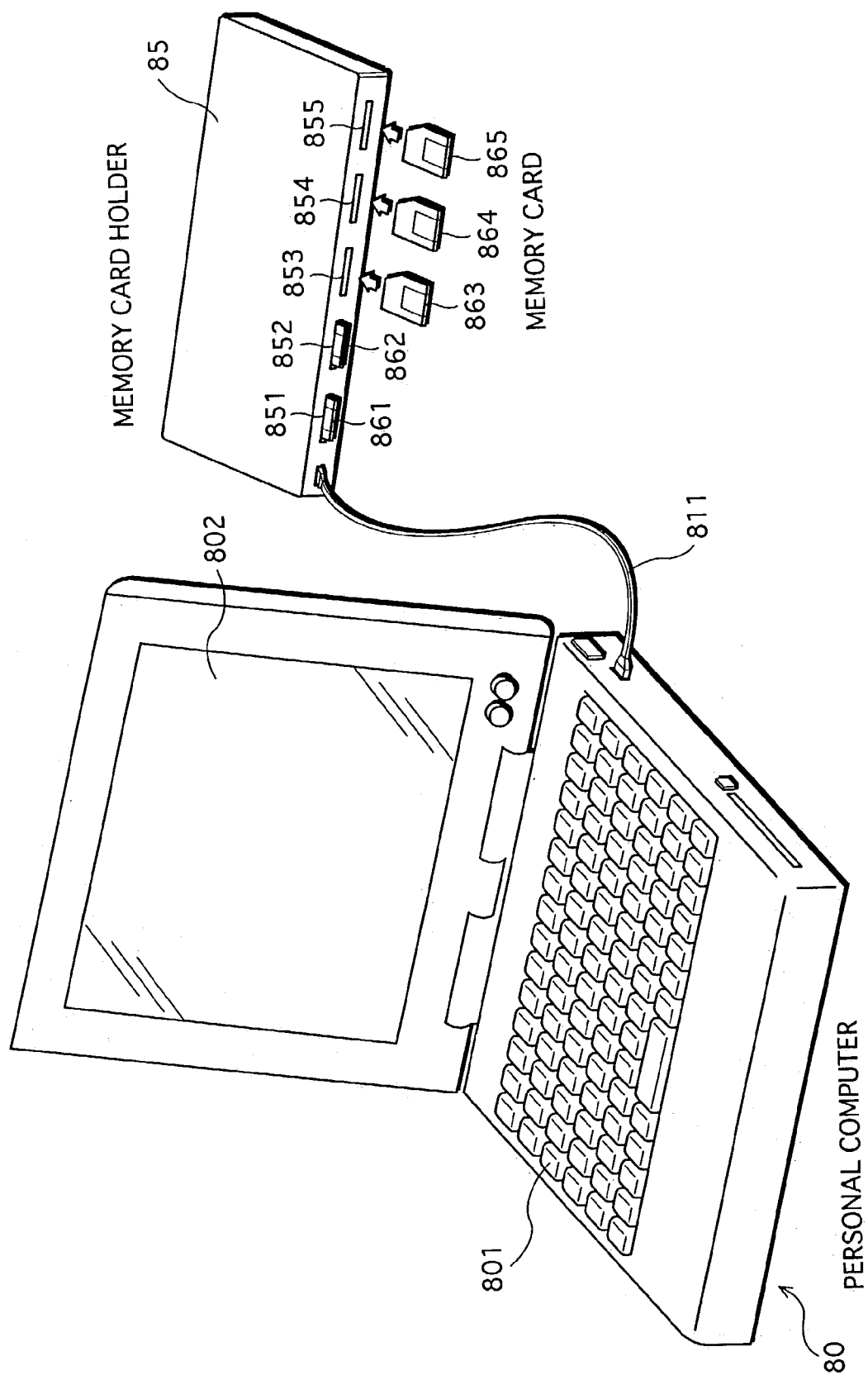
FIG. 28 shows an outside view of a personal computer 80 and a memory card holder 85.

A memory card holder 85, as shown in an outside view in FIG. 28, is an apparatus for holding up to 5 memory cards.

A user uses the memory card holder 85 by connecting the memory card holder 85 and a personal computer 80 via a USB cable 811.

The memory card holder 85 includes five card connecting units 851–855 on a side surface thereof. When a memory card is inserted in one of the card connecting units, the memory card and the memory card holder 85 are electrically connected. In the drawing, memory cards 861–862 are inserted in the card connecting units 851–852 and connected respectively. The memory cards are not inserted in the card connecting units 853–855.

The personal computer 80 is a computer system including a micro processor, a ROM, a RAM, a hard disk unit, a liquid crystal displaying unit 802, a keyboard unit 801, and such. A computer program is stored in the RAM or the hard disk unit. The personal computer 80 achieves functions thereof when the microprocessor is operated according to the computer program.

The memory card holder 85 corresponds to the memory card holding unit 10c of the memory card holder 10 in FIG. 1, the USB cable 811 corresponds to the connecting member 10b, and the personal computer 80 corresponds to the input displaying unit 10a.

An operation of the memory card holder 85 and the personal computer 80 connected via the USB cable 811 is the same as the memory card holder 10 illustrated in FIG. 1.

(2) The memory card holder may also have a structure described below.

Figure 29:
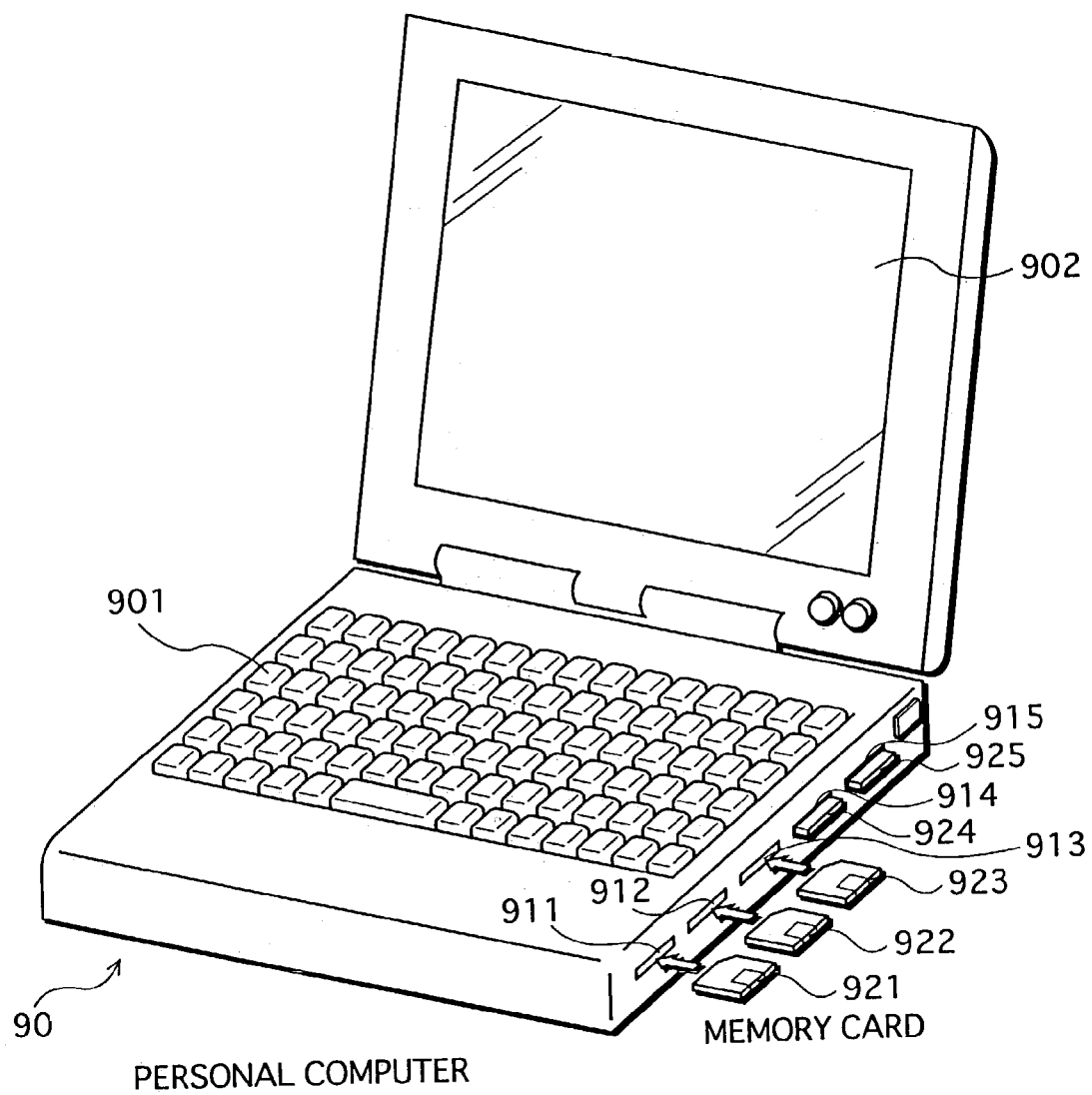
FIG. 29 shows an outside view of a personal computer 90.

A personal computer 90, as shown in an outside view in FIG. 29, is a computer system same as the personal computer 80. The personal computer 90 achieves functions thereof when a microprocessor is operated according to a computer program.

The personal computer 90 includes five card connecting units 911–915 on a side surface thereof. When the memory card is inserted in one of the card connecting units, the memory card and the personal computer 90 are electrically connected. The personal computer 90 also works as a memory card holding apparatus capable of holding up to five memory cards.

In the drawing, memory cards 924–925 are inserted in the card connecting units 914–915 and connected respectively. The memory cards are not inserted in the card connecting units 911–913.

An operation of the personal computer 90 is the same as the memory card holder 10 illustrated in FIG. 1.

(3) The present invention may also be a method that has been explained in the above. Further, the present invention may be a computer program that realizes the method by a computer, as well as a digital signal representing the computer program.

Moreover, the present invention may also be a computer readable recording medium that stores the computer program or the digital signal. Examples of the computer readable recording medium include a flexible disc, a hard disk, a CD-ROM, a MO, a DVD, a DVD-ROM, a DVD-RAM, a BD (Blu-ray Disc), a semiconductor memory, and such. In addition, the present invention may also be the computer program or the digital signal stored in the computer readable recording medium.

The present invention as the computer program or the digital signal may be transmitted via a telecommunication line, a wireless connection, a cable communication line, and the network represented by the Internet, a data and audio broadcast, and the like.

The present invention may also be a computer system having a memory that stores the computer program and a microprocessor that operates according to the computer program.

Further, the present invention as the computer program or the digital signal may be transferred to another independent computer system via the recording medium or the network so as to be executed in the destination.

(4) The present invention is also achieved by a combination of the above embodiments, a part of the above embodiments, and the above modified examples.

4. Advantageous Effect of the Invention

As has been described, the present invention is such that a recording medium holder comprises a holding unit operable to hold, in an electrically connection, one or more portable recording mediums, the recording medium being readable and writable in the connection and storing digital information or a set including digital information and index information relating to the digital information; a selecting unit operable to select one recording medium from the one or more portable recording mediums held in the connection; a judging unit operable to judge whether an access to the digital information stored in the selected recording medium is allowed; and a displaying unit operable to display the digital information or the index information recorded in the selected recording medium when the judging unit judges that the access is allowed.

According to the above construction, information stored in the recording medium is displayed when the judgment is that the access is allowed. Therefore, it is possible to treat the recording medium safely even when the recording medium stores secret information.

Further, the above recording medium holder is such that the judging unit includes an input sub-unit operable to accept a user password; a device password storing unit operable to store a device password in advance; and a password judging sub-unit operable to compare the accepted user password and the stored device password, and to judge that the access is allowed when the user and device passwords are identical.

According to the above construction, whether or not the access is allowed is judged by verifying the device password that is registered in the recording medium holder and the accepted user password. Therefore, only an authorized user who knows the device password is granted an access.

Further, the above recording medium holder is such that the recording medium includes a password storing unit that stores a medium password in advance, and the judging unit includes an input unit operable to accept a user password; and a password judging unit operable to compare the accepted user password and the stored medium password, and to judge that the access is allowed when the user and medium passwords are identical.

According to the above construction, whether or not the access is allowed is judged by verifying the medium password that is registered in the recording medium and the accepted user password. Therefore, only an authorized user who knows the medium password is granted an access.

Further, the above recording medium holder is such that the displaying unit further displays icons each corresponding to the recording mediums that are each held in the connection, and the selecting unit accepts a selection of an icon from the displayed icons by clicking the icon, and selects the recording mediums corresponding to the selected icon.

According to the above construction, it is possible to select the recording medium by selecting the icon. Therefore, the selection of the recording medium becomes visually convenient.

Further, the above recording medium holder is such that a recording medium holder further includes a recording unit that includes a recording area for recording information temporarily, and that the selecting unit is further operable to record, when the selected recording medium is selected for a first time, the digital information or the set of the digital information and the index information that are stored in the selected recording medium in the recording unit, and the displaying unit displays, when the selected recording medium is selected for a second time and later, the digital information or the index information that are stored in the recording unit instead of the selected recording medium.

According to the above construction, when the same recording medium is selected more than once, the information recorded in the recording medium holder is displayed. Therefore, it is possible to make a period of time required for processing shorter.

Further, the above recording medium holder is such that a recording medium holder further includes a text string input unit operable to accept a text string; and a searching unit operable to, based on the input text string, search the digital information stored in the recording medium held in the connection, and notifies a user of the recording medium storing the digital information that corresponds to the input text string.

According to the above construction, the user is notified of the recording medium that stores information having the inputted text string. Therefore, it is possible for the user to find out the desired recording medium.

Moreover, the present invention also is an electronic card system structured by one or more portable recording mediums that is readable and writable in a contactless state via radio waves, and a holding device that holds the recording mediums such that the electronic card system comprising the recording medium that includes an information storing unit operable to store digital information, and a sending/receiving unit operable to transmit the digital information via radio waves; and the holding device that includes a holding unit provided with a medium holding plate and a plurality of sets that each include a transmitting unit and a lighting unit, the medium holding plate being divided into partitions of an identical number with the sets, the sets each being disposed so as to face a different one of the partitions, the transmitting units each reading, via the radio waves, the digital information from the recording medium that is held on the medium holding plate so as to cover at least a part of the partition that faces the transmitting unit, and each outputting the digital information to a controlling unit, and the lighting units each emitting light under control of the controlling unit, the controlling unit operable to receive the digital information, to generate display information based on the generated display information and output the received digital information, and to control a, lighting unit corresponding to the transmitting unit that outputted the digital information to emit light, and a displaying unit operable to receive and display the display information.

According to the above construction, it is possible to select the desired recording medium without an extra effort such as manually inserting the recording medium into the extracting apparatus.

Further, the above an electronic card system is such that the recording medium further includes an output unit operable to emit light, vibrate, or make sound, and the controlling unit further controls, upon receiving the digital information, the output unit to emit light, vibrate, or make sound, via the radio waves through the transmitting unit and the sending/receiving unit.

According to the above construction, the desired recording medium emits light, vibrates, or makes sounds, and therefore the desired recording medium can be easily identified.

Further, the above an electronic card system is such that the controlling unit further accepts search information from a user, identify the digital information which corresponds to the accepted search information, and controls the lighting unit to emit light, the lighting unit facing the partition in which the recording medium storing the identified digital information is held.

According to the above construction, light is emitted at the position where the desired recording medium is placed, and therefore it is possible for the user to identify the desired recording medium easily.

Although the present invention has been fully described by way of examples by referring to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A recording medium holder comprising:
   a holding unit operable to hold two or more portable recording mediums in electrical connection thereto, each of the portable recording mediums storing therein digital information or a set including digital information and index information relating to the digital information;
   an input unit operable to receive an input selection from a user;
   a selecting unit operable to select, based on the input selection received from the user, one portable recording medium from the two or more portable recording mediums;
   a judging unit operable to judge whether access is allowed to the digital information stored in the selected portable recording medium; and
   a displaying unit operable to display the digital information or the index information recorded in the selected portable recording medium when the judging unit judges that access is allowed.

2. A recording medium holder according to claim 1, further comprising:
   a medium-type identification unit operable to identify a medium type of the selected portable recording medium; and
   an authentication unit operable to, when the identified medium type indicates that the selected portable recording medium requires mutual authentication, perform mutual authentication with the selected portable recording medium,
   wherein said judging unit judges whether access to the digital information is allowed based on a result of the mutual authentication.

3. A recording medium holder according to claim 1, further comprising:
   an input unit operable to receive an input password from the user;
   a password storing unit storing therein a device password in advance;
   a medium-type identification unit operable to identify a medium type of the selected portable recording medium; and
   a password checking unit operable to, when the identified medium type indicates that the selected portable recording medium requires a device password verification, perform the device password verification by checking whether the input password from the user matches the device password,
   wherein said judging unit judges whether access to the digital information is allowed based on a result of the device password verification.

4. A recording medium holder according to claim 1,
   wherein each of the portable recording mediums includes a password storing unit that stores therein a medium password in advance; and
   wherein the recording medium holder further comprises:
   an input unit operable to receive an input password from the user;
   a medium-type identification unit operable to identify a medium type of the selected portable recording medium; and
   a password checking unit operable to, when the identified medium type indicates that the selected portable recording medium requires a medium password verification, perform the medium password verification by checking whether the input password from the user matches the medium password,
   wherein said judging unit judges whether access to the digital information is allowed based on a result of the medium password verification.

* * * * *